United States Patent [19]

Rahman et al.

[11] Patent Number: 5,765,007
[45] Date of Patent: Jun. 9, 1998

[54] MICROINSTRUCTION SEQUENCER HAVING MULTIPLE CONTROL STORES FOR LOADING DIFFERENT RANK REGISTERS IN PARALLEL

[75] Inventors: Mizanur M. Rahman, Cupertino, Calif.; Robert W. Horst, Champaign, Ill.; Richard Harris, Campbell, Calif.

[73] Assignee: Tandem Computers Incorporated, Cupertino, Calif.

[21] Appl. No.: 976,304

[22] Filed: Nov. 13, 1992

Related U.S. Application Data

[63] Continuation of Ser. No. 441,789, Nov. 27, 1989, abandoned.

[51] Int. Cl.$^6$ .................................................. G06F 9/22
[52] U.S. Cl. .......................... 395/800; 395/580; 395/595; 364/232.8; 364/246.4; 364/261.3; 364/262.7; 364/DIG. 1
[58] Field of Search ............................... 395/800, 425, 395/400, 375, 376, 371, 580–583, 589–590, 595–598, 405, 427, 452, 484, 421.05; 365/189.01, 189.04, 230.01, 230.03

[56] References Cited

U.S. PATENT DOCUMENTS

| | | | |
|---|---|---|---|
| 3,909,797 | 9/1975 | Gross et al. | 395/375 |
| 4,027,291 | 5/1977 | Tokura et al. | 340/172.5 |
| 4,112,502 | 9/1978 | Scheuneman | 395/575 |
| 4,325,121 | 4/1982 | Gunter et al. | 395/575 |
| 4,373,180 | 2/1983 | Linde | 364/200 |
| 4,390,946 | 6/1983 | Lane | 364/200 |
| 4,439,827 | 3/1984 | Wilkes | 395/375 |
| 4,519,033 | 5/1985 | Vaughn et al. | 395/550 |
| 4,546,431 | 10/1985 | Horvath | 364/200 |
| 4,571,673 | 2/1986 | Horst et al. | 364/200 |
| 4,574,344 | 3/1986 | Harris et al. | 395/500 |
| 4,613,935 | 9/1986 | Couleur | 395/375 |
| 4,754,396 | 6/1988 | Horst et al. | 364/200 |
| 4,812,970 | 3/1989 | Kitamura et al. | 395/375 |
| 4,823,252 | 4/1989 | Horst et al. | 371/8 |
| 4,837,681 | 6/1989 | Fuller | 395/375 |
| 4,841,434 | 6/1989 | Mathews, Jr. et al. | 364/200 |
| 4,890,218 | 12/1989 | Bram | 395/375 |
| 4,901,235 | 2/1990 | Vora et al. | 395/375 |
| 4,907,192 | 3/1990 | Kaneko | 395/375 |
| 5,021,977 | 6/1991 | Sakaguchi | 364/521 |
| 5,101,341 | 3/1992 | Circello et al. | 395/375 |

*Primary Examiner*—Alpesh M. Shah
*Attorney, Agent, or Firm*—Townsend and Townsend and Crew LLP

[57] ABSTRACT

First and second banks of control stores are used to store microinstructions. Each bank contains three control stores: A horizontal control store, a vertical control store, and a jump control store. The horizontal control store contains the rank four microcode; the vertical control store contains the rank three microcode; and the jump control store contains the same microcode as the vertical control store but is used on conditional jump microoperations. This allows simultaneous accessing of different microinstructions using a single address incrementer. The control store banks are accessed in an overlapping manner so that upon each clock cycle one bank is loading the rank 3 and rank 4 registers. The sequencer according to the present invention includes a return address stack for returning from subroutine calls and trap routines. When processing trap routines, the return address stack stores two microinstruction addresses to allow processing of a previously encountered jump or call operation that may have been aborted when the trap routine was entered.

26 Claims, 22 Drawing Sheets

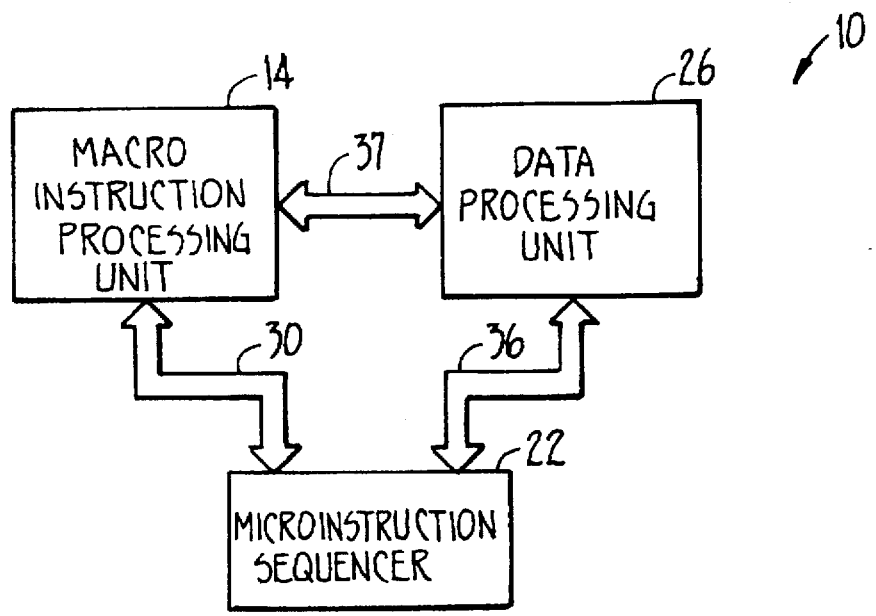
FIG._1.
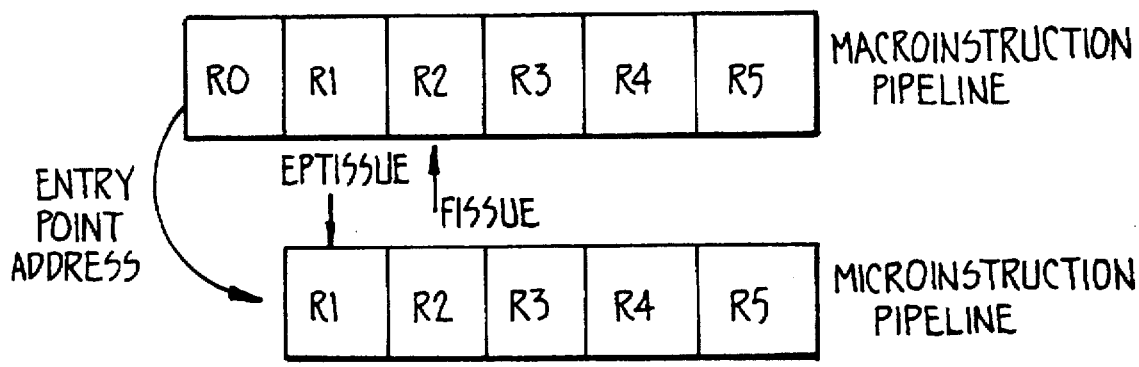
FIG._2.

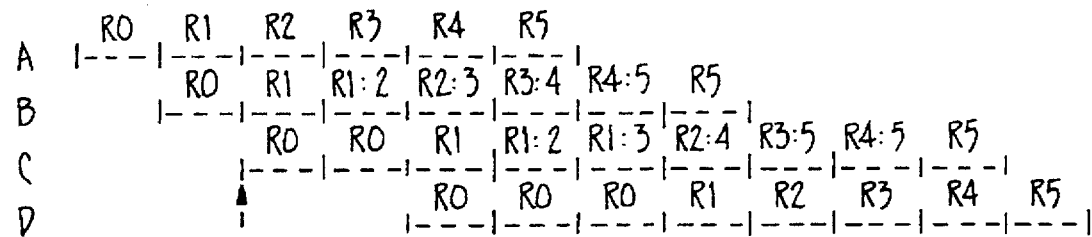
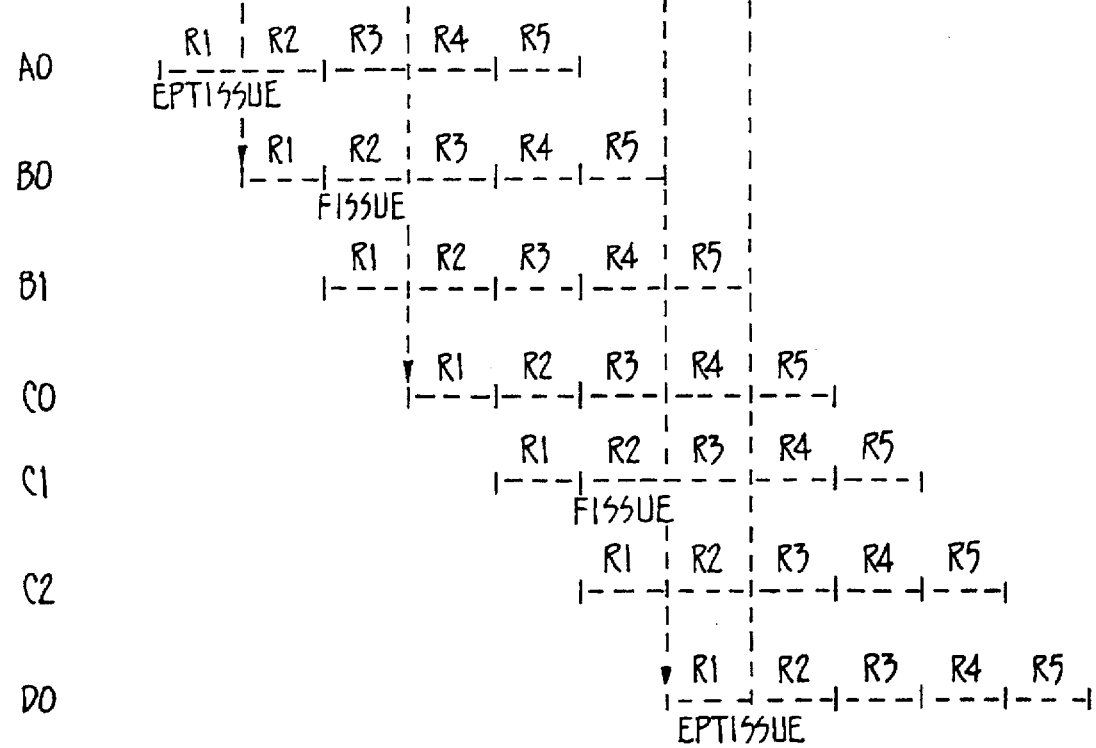
FIG._3.

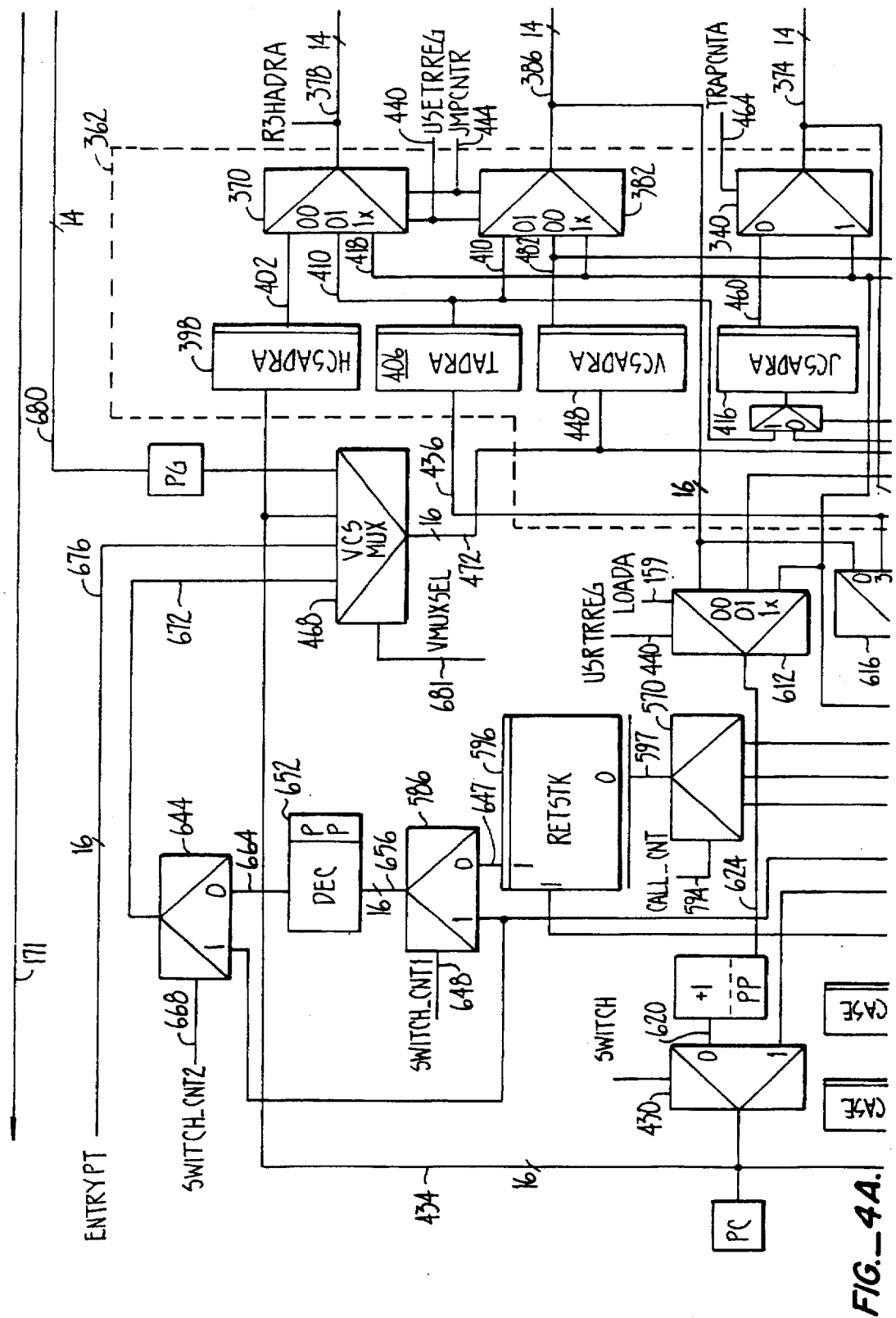
FIG._4A.

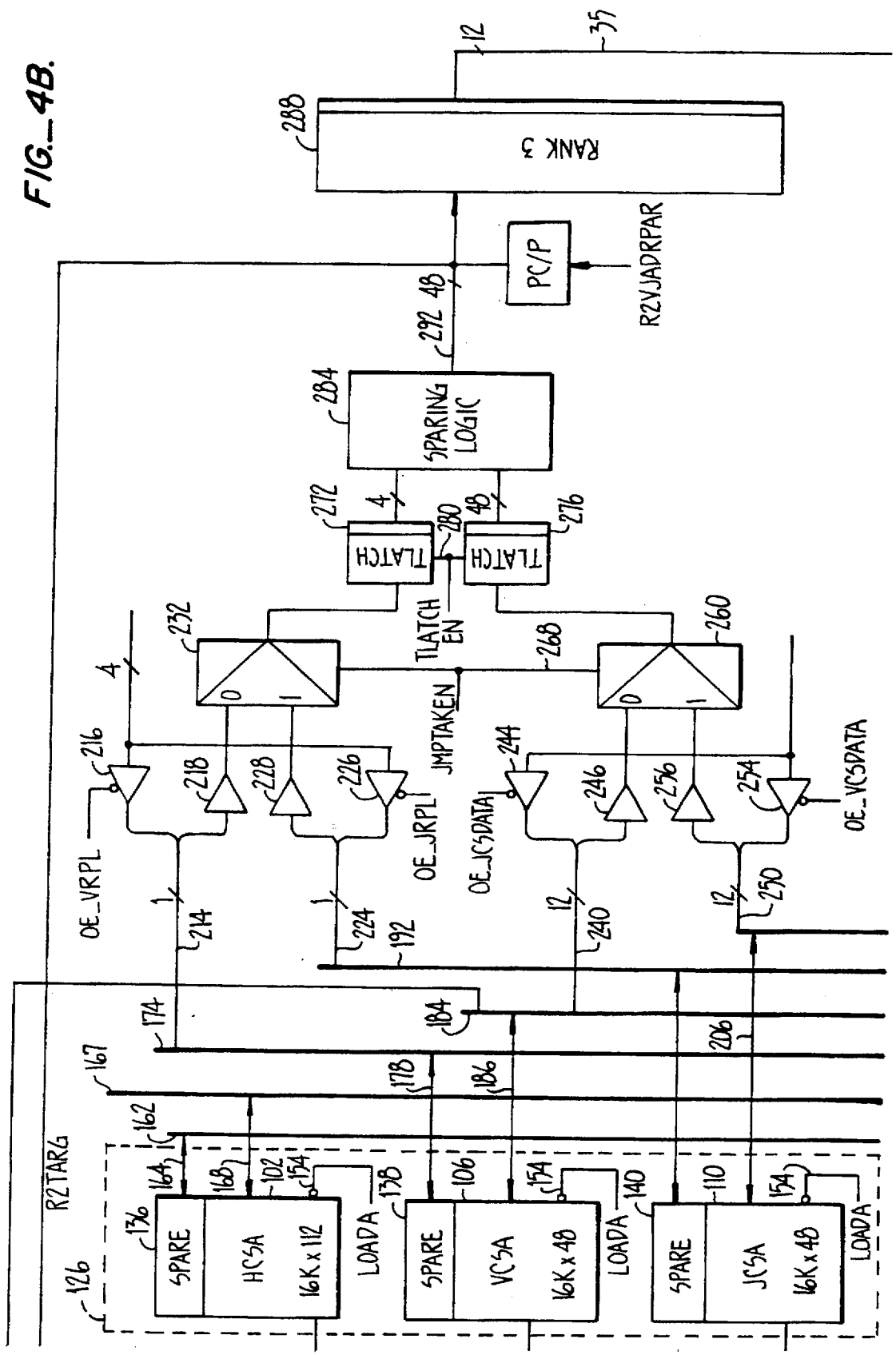
FIG._4B.

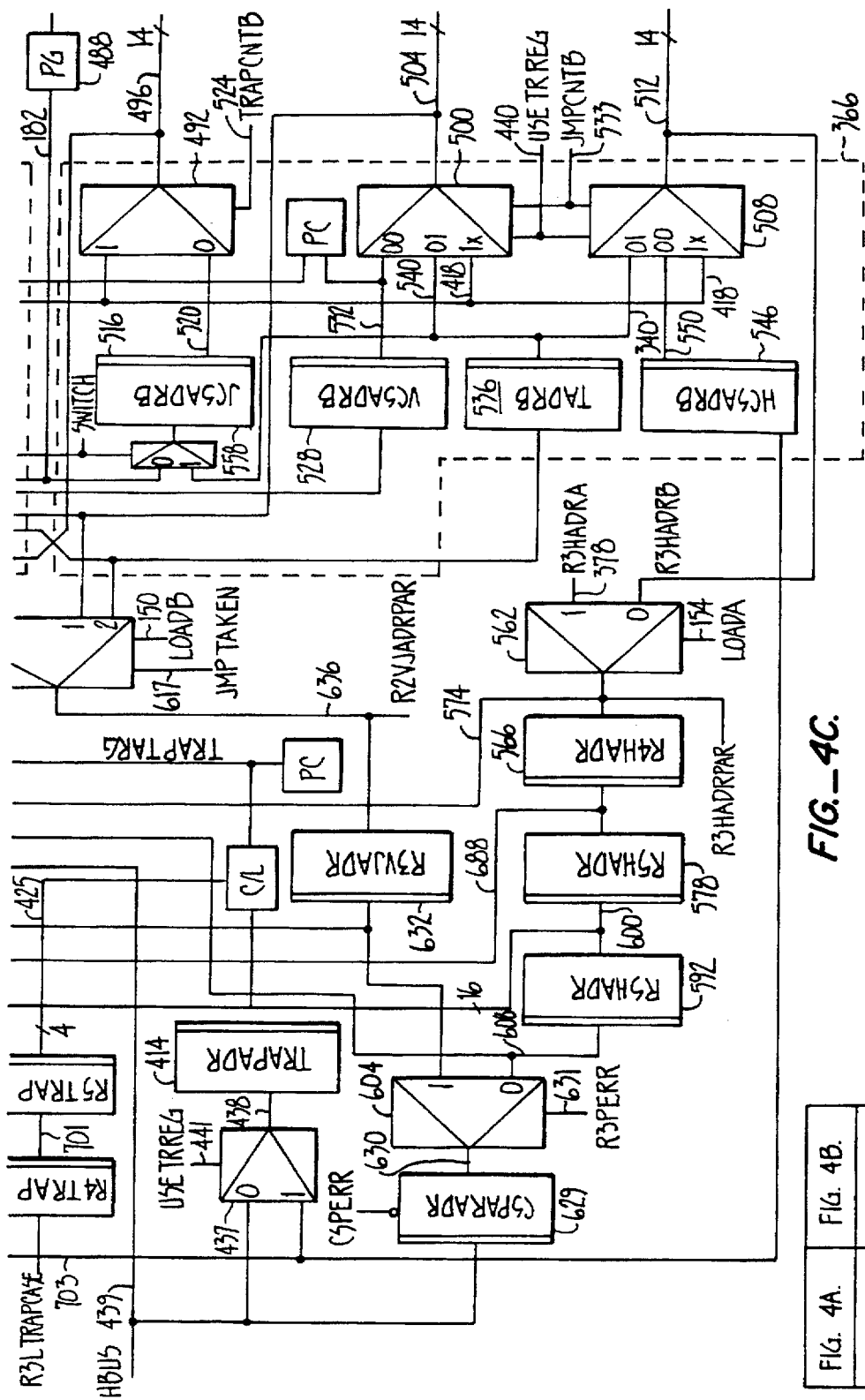

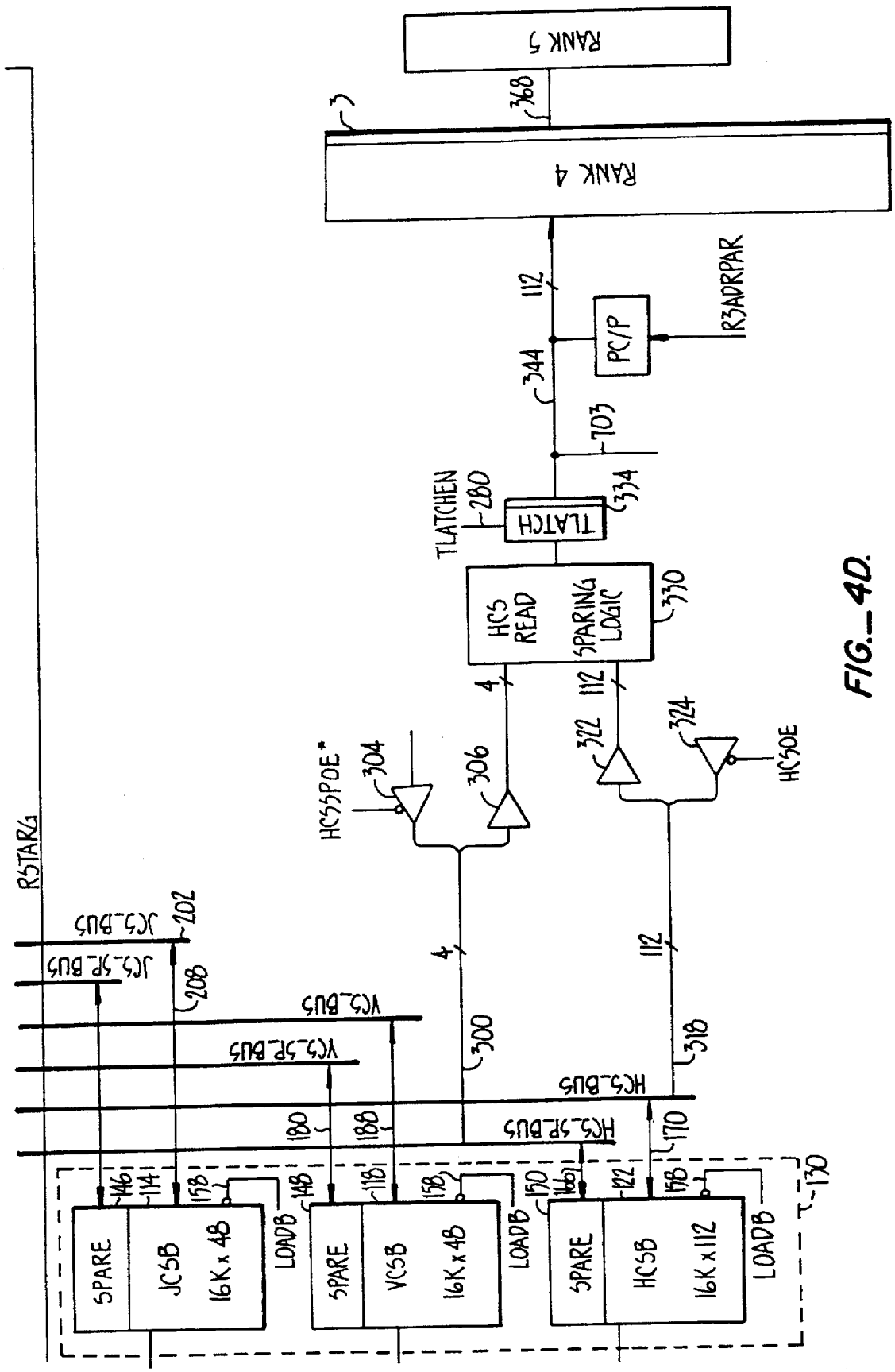
FIG._4D.

CONTROL STORES:

HCS

| | |
|---|---|
| 0 | HL 16383 |
| 1 | HL 0 |
| 2 | ⋮ |
| 16382 | HL 16381 |
| 16383 | HL 16382 |

VCS

| | |
|---|---|
| 0 | VL0 |
| 1 | VL1 |
| 2 | ⋮ |
| 16382 | VL 16382 |
| 16383 | VL 16383 |

JCS

| | |
|---|---|
| 0 | VL 16383 |
| 1 | VL 0 |
| 2 | ⋮ |
| 16382 | VL 16381 |
| 16383 | VL 16382 |

HLi : ith HORIZONTAL CONTROL LINE
VLi : ith VERTICAL CONTROL LINE

*FIG._5.*

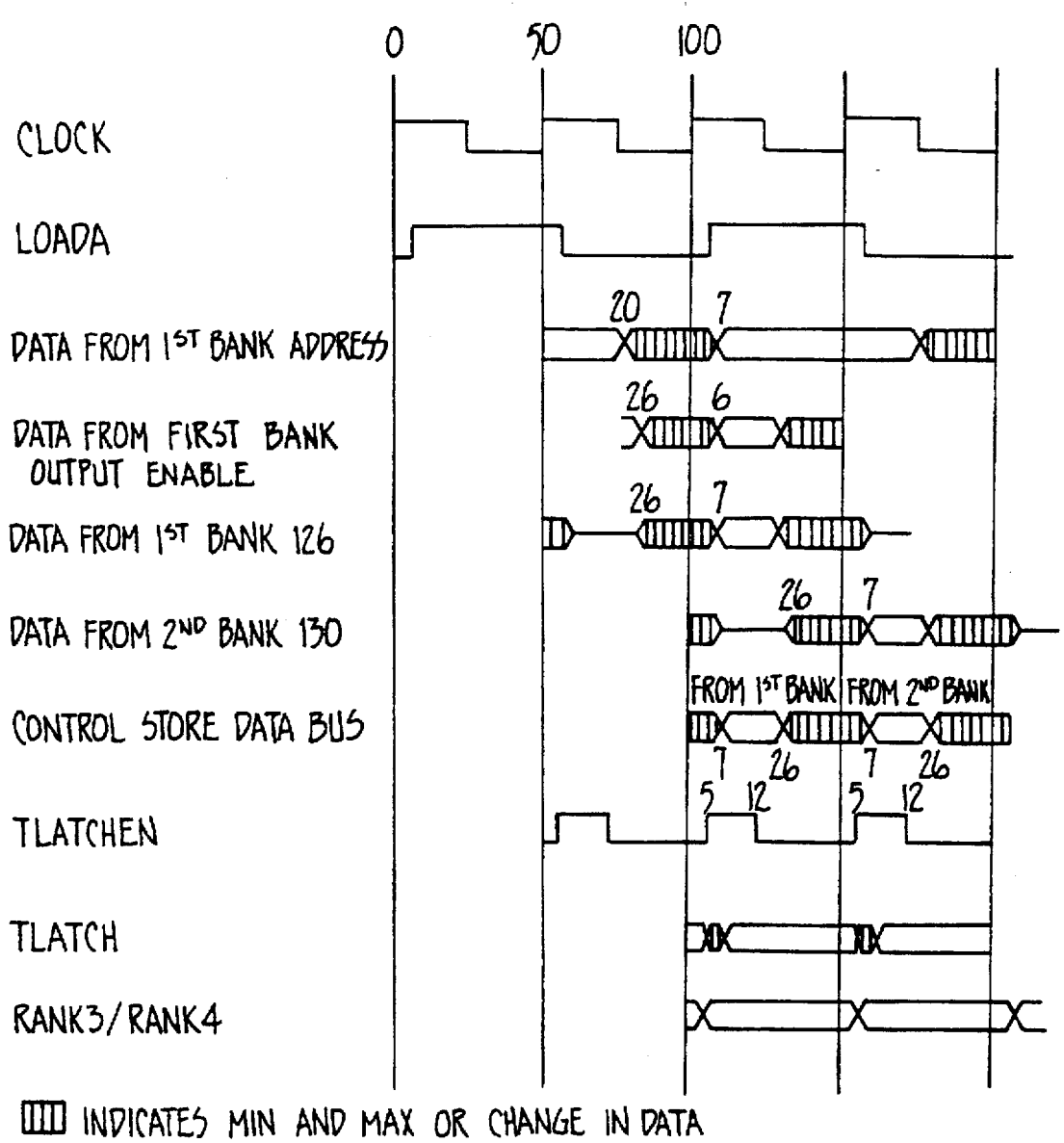
FIG._6.

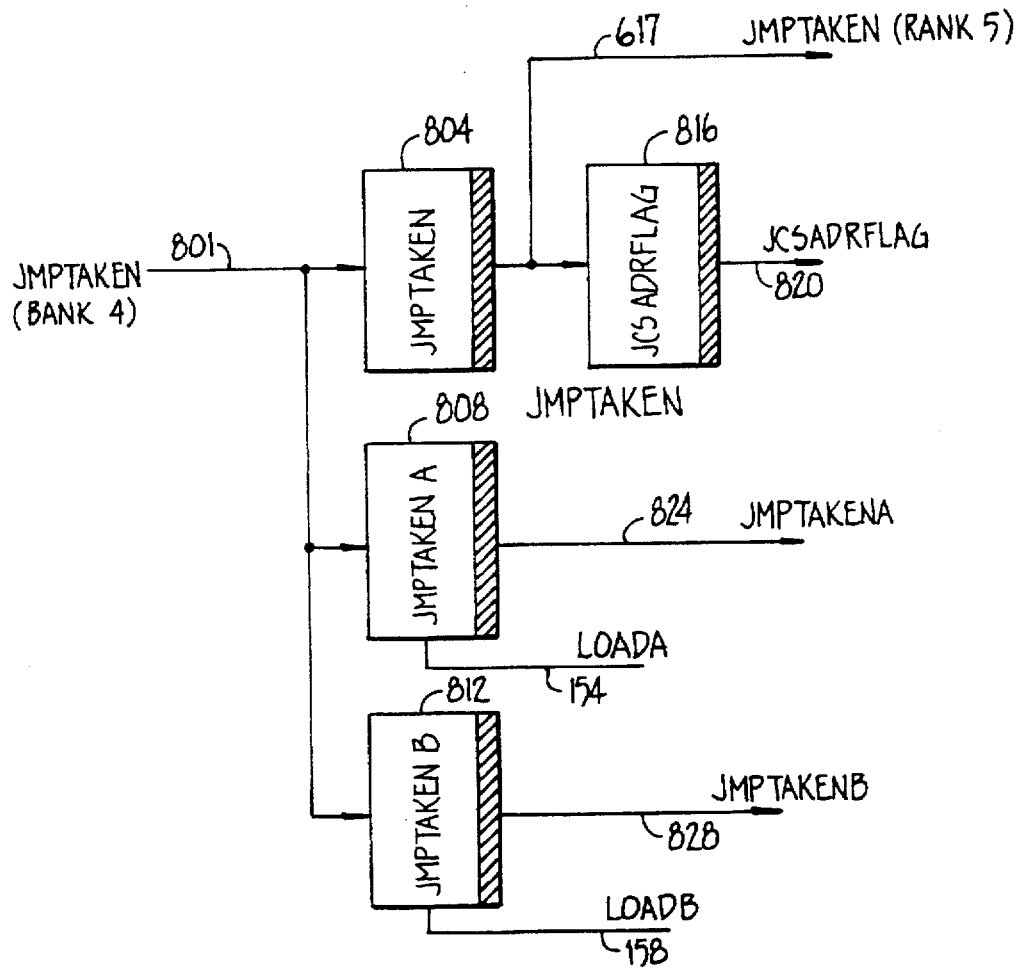
FIG._7.
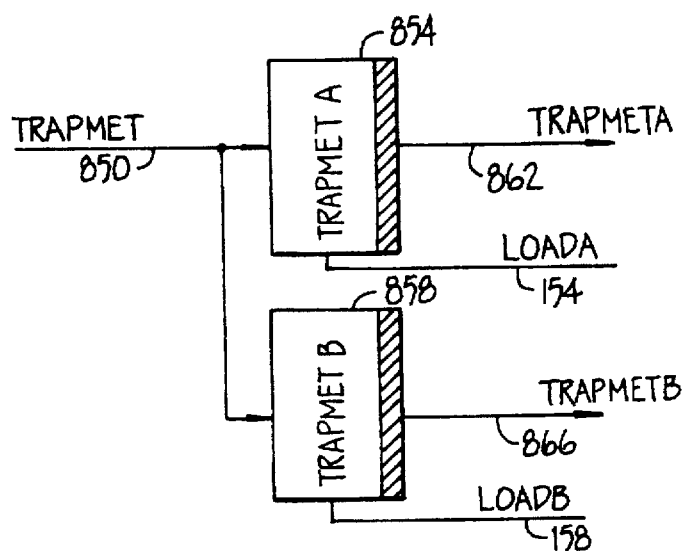
FIG._9.

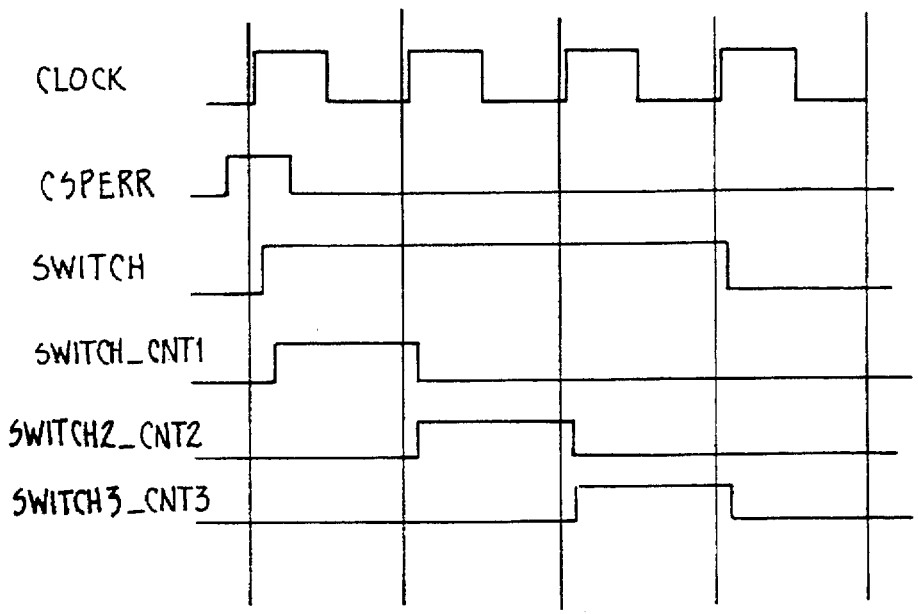
FIG._8.
$C_0$
$C_1$    IF $\langle COND_1 \rangle$ GO TO $TARG_1$ AND DO BOTH
$C_2$
      TRAP ON $COND_2$ TO $TARG_2$
$C_3$
$C_4$    $COND_{1:2}$ = FF   $C_0$   $C_1$   $C_2$   $C_3$   ...    SAVED IN RETSTK
$C_5$               = FT   $C_0$   $C_1$   $C_2$   $C_3$   $C_4$   $C_5$   $C_6$   $C_{TARG_2}$ ...
$C_6$               = TF   $C_0$   $C_1$   $C_2$   $C_3$   $C_{TARG_1}$ ...
$C_7$
$C_8$               = TT   $C_0$   $C_1$   $C_2$   $C_3$   $C_{TARG_1}$   $C_{TARG_1+1}$   $C_{TARG_1+2}$   $C_{TARG_1+3}$ ...
FIG._18.    SAVED IN RETSTK CASE: SEQUENTIAL OPERATION
MICROCODE:
0 > SEQOPR:
1 > SEQOPR: 4 > SEQOPR:
2 > SEQOPR: 5 > SEQOPR:
3 > SEQOPR: 6:20> SEQOPR:

SIMULATION

| CLOCK # | RETSTK0 | RETSTK1 | PARADR | R3VJADR | R4HADR | SWITCH | PCHKEN | PAUSE | VPERR | HPERR | NOP3 | NOP4 | NOP5 | TRAPADR | TRAPMET | JMPTAKEN | TRAPMETB | JMPTAKENB | VC5ADRB | JC5ADRB | TAPRB | HC5ADRB | TRAPMETA | JMPTAKENA | VC5ADRA | JC5ADRA | TAPRA | HC5ADRA | LOADA | R3REG | R4REG | R5REG |
|---|---|---|---|---|---|---|---|---|---|---|---|---|---|---|---|---|---|---|---|---|---|---|---|---|---|---|---|---|---|---|---|---|
| 0 | 0 | 0 | 0 | 0 | 0 | | 1 | | | | | | | x | | | | | 0 | x | x | 0 | | | | | | | | | | x |
| 1 | 0 | 0 | 0 | 0 | 0 | | 1 | | | | | | | | | | | | | | | | | | 1 | x | x | 1 | 1 | | x | x |
| 2 | 0 | 0 | 1 | 1 | 1 | | 1 | | | | | | | x | | | | | 2 | 2 | x | 2 | | | | | | | | | 0 | x |
| 3 | 0 | 0 | 2 | 2 | 2 | | 1 | | | | | | | | | | | | | | | | | | 3 | x | x | 3 | 1 | 1 | 1 | 0 |
| 4 | 0 | 0 | 3 | 3 | 3 | | 1 | | | | | | | x | | | | | 4 | 4 | x | 4 | | | | | | | | 2 | 2 | 1 |
| 5 | 0 | 0 | 4 | 4 | 4 | | 1 | | | | | | | | | | | | | | | | | | 5 | x | x | 5 | 1 | 3 | 3 | 2 |
| 6 | 0 | 0 | 5 | 5 | 5 | | 1 | | | | | | | x | | | | | 6 | 6 | x | 6 | | | | | | | | 4 | 4 | 3 |
| 7 | 0 | 0 | 6 | 6 | 6 | | 1 | | | | | | | | | | | | | | | | | | 7 | x | x | 7 | 1 | 5 | 5 | 4 |
| 8 | 0 | 0 | 7 | 7 | 7 | | 1 | | | | | | | x | | | | | 8 | 8 | x | 8 | | | | | | | | 6 | 6 | 5 |
| 9 | 0 | 0 | 8 | 8 | 8 | | 1 | | | | | | | | | | | | | | | | | | 9 | x | x | 9 | 1 | 7 | 7 | 6 |
| 10 | 0 | 0 | 9 | 9 | 9 | | 1 | | | | | | | x | | | | | 10 | 10 | x | 10 | | | | | | | | 8 | 8 | 7 |
| 11 | 0 | 0 | 10 | 10 | 10 | | 1 | | | | | | | | | | | | | | | | | | 11 | x | x | 11 | 1 | 9 | 9 | 8 |
| 12 | 0 | 0 | 11 | 11 | 11 | | 1 | | | | | | | x | | | | | 12 | 12 | x | 12 | | | | | | | | 10 | 10 | 9 |
| 13 | 0 | 0 | 12 | 12 | 12 | | 1 | | | | | | | | | | | | | | | | | | 13 | x | x | 13 | 1 | 11 | 11 | 10 |
| | | | | | | | | | | | | | | x | | | | | 14 | 14 | x | 14 | | | | | | | | 12 | 12 | 11 |
| | | | | | | | | | | | | | | | | | | | | | | | | | 13 | x | x | 13 | 1 | 13 | 13 | 12 |

FIG._10.

CASE: JUMP UNCONDITIONAL
MICROCODE:
0 > SEQOPR:
1 > SEQOPR:
2 > SEQOPR:
3 > SEQOPR:
4 > JUMPUNC, TARG=12; INHIB1:2=10
5 > SEQOPR:
6:20 > SEQOPR:

| CLOCK# | RETSTKO | RETSTK1 | PARADR | R3VJADR | R4HADR | SWITCH | PCHKEN | PAUSE | VPERR | HPERR | NOP3 | NOP4 | NOP5 | TRAPADR | TRAPMET | JMPTAKEN | TRAPMETB | JMPTAKENB | VC5ADRB | JC5ADRB | TAPRB | HC5ADRB | TRAPMETA | JMPTAKENA | VC5ADRA | JC5ADRA | TAPRA | HC5ADRA | LOADA | R3REG | R4REG | R5REG |
|---|---|---|---|---|---|---|---|---|---|---|---|---|---|---|---|---|---|---|---|---|---|---|---|---|---|---|---|---|---|---|---|---|
| 0 | 0 | 0 | 0 | 0 | 0 | | 1 | | | | | | | x | | | | | 0 | 0 | x | 0 | | | | | | 1 | 1 | 0 | x | x |
| 1 | 0 | 0 | 0 | 0 | 0 | | 1 | | | | | | | x | | | | | | | | | | | 1 | x | x | 1 | | 0 | 0 | x |
| 2 | 0 | 0 | 1 | 1 | 1 | | 1 | | | | | | | x | | | | | 2 | 2 | x | 2 | | | | | | | 1 | 1 | 0 | 0 |
| 3 | 0 | 0 | 2 | 2 | 2 | | 1 | | | | | | | x | | | | | 2 | 2 | x | 2 | | | | 3 | x | 3 | | 2 | 1 | 0 |
| 4 | 0 | 0 | 3 | 3 | 3 | | 1 | | | | | | | x | | | | | 4 | 4 | x | 4 | | | | | | | 1 | 3 | 2 | 1 |
| 5 | 0 | 0 | 4 | 4 | 4 | | 1 | | | | | | 1 | x | | | | | 4 | 4 | x | 4 | | | | 5 | x | 5 | | 4 | 3 | 2 |
| 6 | 0 | 0 | 5 | 5 | 5 | | 1 | | | | | | | x | | | | | | | | | | | | | | | 1 | 5 | 4 | 3 |
| 7 | 0 | 0 | 12 | 11 | 12 | | 1 | | | | | 1 | | x | | | | | 12 | 12 | x | 12 | | | 11 | 11 | x | 11 | | 12 | 5 | 4 |
| 8 | 0 | 0 | 13 | 12 | 13 | | 1 | | | | | | | x | | | | | 12 | 12 | x | 12 | | | | | | | 1 | 13 | 12 | 5 |
| 9 | 0 | 0 | 14 | 13 | 14 | | 1 | | | | | | | x | | | | | 14 | 14 | x | 14 | | | | 15 | x | 15 | | 14 | 13 | 12 |
| 10 | 0 | 0 | 15 | 14 | 15 | | 1 | | | | | | | x | | | | | 14 | 14 | x | 14 | | | | | | | 1 | 15 | 14 | 13 |
| 11 | 0 | 0 | 16 | 15 | 16 | | 1 | | | | | | | x | | | | | 16 | 16 | x | 16 | | | | 17 | x | 17 | | 16 | 15 | 14 |
| 12 | 0 | 0 | 17 | 16 | 17 | | 1 | | | | | | | x | | | | | 16 | 16 | x | 16 | | | | | | | 1 | 17 | 16 | 15 |
| 13 | 0 | 0 | 18 | 17 | 18 | | 1 | | | | | | | x | | | | | 18 | 18 | x | 18 | | | | 19 | x | 19 | | 18 | 17 | 16 |
| | | | | | | | | | | | | | | | | | | | 20 | 20 | x | 20 | | | | | | | | 19 | 18 | 17 |

FIG._11.

CASE: JUMP CONDITIONAL
MICROCODE:
0 > SEQOPR:
1 > SEQOPR:
2 > SEQOPR:
3 > JUMPCOND, TARG=D, CONDITION=TRUE; INHIB1:2=1
4 > SEQOPR:
5 > SEQOPR:
6 > SEQOPR:

| CLOCK# | RETSTKD | RETSTKI | PARADR | R3VJADR | R4JADR | SWITCH | PCHKEN | PAUSE | VPERR | HPERR | NOP3 | NOP4 | NOP5 | TRAPADR | TRAPMET | JMPTAKEN | TRAPMETB | JMPTAKENB | VC5ADRB | JC5ADRB | TADRB | HC5ADRB | TRAPMETA | JMPTAKENA | VC5ADRA | JC5ADRA | TADRA | HC5ADRA | LOADA | R3REG | R4REG | R5REG |
|---|---|---|---|---|---|---|---|---|---|---|---|---|---|---|---|---|---|---|---|---|---|---|---|---|---|---|---|---|---|---|---|---|
| 0 | 0 | 0 | 0 | 0 | 0 | | 1 | | | | | | | x | | | | | 0 | x | x | 0 | | | 1 | x | x | 1 | | 0 | x | x |
| 1 | 0 | 0 | 0 | 0 | 0 | | 1 | | | | | | | x | | | | | 2 | x | x | 2 | | | 1 | x | x | 1 | 1 | 1 | 0 | x |
| 2 | 0 | 0 | 1 | 1 | 1 | | 1 | | | | | | | x | | | | | 2 | x | x | 2 | | | 3 | x | x | 3 | 1 | 2 | 1 | 0 |
| 3 | 0 | 0 | 2 | 2 | 2 | | 1 | | | | | | | x | | 1 | | | 4 | x | x | 4 | | | 3 | x | x | 3 | 1 | 3 | 2 | 1 |
| 4 | 0 | 0 | 3 | 3 | 3 | | 1 | | | | | | | x | | | | | 4 | x | x | 4 | | | 5 | x | x | 5 | 1 | 4 | 3 | 2 |
| 5 | 0 | 0 | 4 | 4 | 4 | | 1 | | | | | | | x | | | | | 6 | x | 6 | 6 | | | 5 | 6 | x | 5 | 1 | 5 | 4 | 3 |
| 6 | 0 | 0 | 5 | 5 | 5 | | 1 | | | | 1 | | | x | | | | 1 | 6 | x | 6 | 6 | | | 9 | x | x | 9 | 1 | 6 | 5 | 4 |
| 7 | 0 | 0 | 8 | 8 | 8 | | 1 | | | | | 1 | | x | | | | | 10 | x | x | 10 | | | 9 | x | x | 9 | 1 | 7 | 8 | 5 |
| 8 | 0 | 0 | 9 | 9 | 9 | | 1 | | | | | 1 | | x | | | | | 10 | x | x | 10 | | | 11 | x | x | 11 | 1 | 8 | 9 | 8 |
| 9 | 0 | 0 | 10 | 10 | 10 | | 1 | | | | | | 1 | x | | | | | 12 | x | x | 12 | | | 11 | x | x | 11 | 1 | 9 | 10 | 9 |
| 10 | 0 | 0 | 11 | 11 | 11 | | 1 | | | | | | 1 | x | | | | | 12 | x | x | 12 | | | 13 | x | x | 13 | 1 | 10 | 11 | 10 |
| 11 | 0 | 0 | 12 | 12 | 12 | | 1 | | | | | | | x | | | | | 14 | x | x | 14 | | | 13 | x | x | 13 | 1 | 11 | 12 | 11 |
| 12 | 0 | 0 | 13 | 13 | 13 | | 1 | | | | | | | x | | | | | 14 | x | x | 14 | | | 15 | x | x | 15 | 1 | 12 | 13 | 12 |
| 13 | 0 | 0 | 14 | 14 | 14 | | 1 | | | | | | | x | | | | | 16 | x | x | 16 | | | 15 | x | x | 15 | 1 | 13 | 14 | 13 |

CASE: CALL CONDITIONAL
MICROCODE:
0 > SEQOPR;
1 > SEQOPR;
2 > SEQOPR;
3:4 > SEQOPR;

6 > CALLCOND, TARG=16, COND=TRUE; INHIBI:2=11
7:20 > SEQOPR;
21 > SEQOPR;

| CLOCK # | RETSTK0 | RETSTK1 | PARADR | R3VJACR | R4HADR | SWITCH | PCHKEN | PAUSE | VPERR | HPERR | NOP3 | NOP4 | NOP5 | TRAPADR | TRAPMET | JMPTAKEN | TRAPMETB | JMPTAKEND | VCSADRB | JCSADRB | TADRB | HCSADRB | TRAPMETA | JMPTAKENA | VCSADRA | JCSADRA | TADRA | HCSADRA | LOADA | R3REG | R4REG | R5REG |
|---|---|---|---|---|---|---|---|---|---|---|---|---|---|---|---|---|---|---|---|---|---|---|---|---|---|---|---|---|---|---|---|
| 0 | 0 | 0 | 0 | 0 | 0 | | 1 | | | | | | | x | | | 0 | | 0 | 0 x | 0 x | 0 | | | 1 | x | x | 1 | | 0 | x | x |
| 1 | 0 | 0 | 0 | 0 | 0 | | 1 | | | | | | | x | | | 2 | | 2 | 2 x | 2 x | 2 | | | 1 | x | x | 1 | | 1 | 0 | 0 |
| 2 | 0 | 0 | 1 | 1 | 1 | | 1 | | | | | | | x | | | 2 | | 2 | 2 x | 2 x | 2 | 3 | x | 3 | x | x | 3 | 1 | 2 | 1 | 0 |
| 3 | 0 | 0 | 2 | 2 | 2 | | 1 | | | | | | | x | | | 4 | | 4 | 4 x | 4 x | 4 | 3 | x | 3 | x | x | 3 | 1 | 3 | 2 | 1 |
| 4 | 0 | 0 | 3 | 3 | 3 | | 1 | | | | | | | x | | | 4 | | 4 | 4 x | 4 x | 4 | 5 | x | 5 | x | x | 5 | 1 | 4 | 3 | 2 |
| 5 | 0 | 0 | 4 | 4 | 4 | | 1 | | | | | | | x | | | 6 | | 6 | 6 x | 6 x | 6 | 5 | x | 5 | x | x | 5 | 1 | 5 | 4 | 3 |
| 6 | 0 | 0 | 5 | 5 | 5 | | 1 | | | | | | | x | | | 6 | | 6 | 6 x | 6 x | 6 | 7 | x | 7 | x | x | 7 | 1 | 6 | 5 | 4 |
| 7 | 0 | 0 | 6 | 6 | 6 | | 1 | | | | | | | x | | | 8 | | 8 | 8 16 x | 8 16 x | 8 | 7 | x | 7 | x | x | 7 | 1 | 7 | 6 | 5 |
| 8 | 7 | 0 | 7 | 7 | 7 | | 1 | | | | | | 1 | x | | 1 | 8 | | 8 | 8 16 x | 8 16 x | 8 | 9 | x | 9 | x | x | 9 | 1 | 8 | 7 | 6 |
| 9 | 0 | 7 | 8 16 | 8 16 | 8 16 | | 1 | | | | | 1 | | x | | | 17 | | 17 | 17 x | 17 x | 17 | 9 | x | 9 | x | x | 9 | 1 | 16 | 8 | 7 |
| 10 | 7 | 0 | 16 17 | 16 17 | 16 17 | | 1 | | | | 1 | | | x | | | 17 | | 17 | 17 x | 17 x | 17 | 18 | x | 18 | x | x | 18 | 1 | 17 | 16 | 8 |
| 11 | 0 | 7 | 17 | 17 | 17 | | 1 | | | | | | | x | | | 19 | | 19 | 19 x | 19 x | 19 | 18 | x | 18 | x | x | 18 | 1 | 18 | 17 | 16 |
| 12 | 7 | 0 | 18 | 18 | 18 | | 1 | | | | | | | x | | | 19 | | 19 | 19 x | 19 x | 19 | 20 | x | 20 | x | x | 20 | 1 | 19 | 18 | 17 |
| 13 | 0 | 7 | 19 | 19 | 19 | | 1 | | | | | | | x | | | 21 | | 21 | 21 x | 21 x | 21 | 20 | x | 20 | x | x | 20 | 1 | 20 | 19 | 18 |
| 14 | 7 | 0 | 20 | 20 20 | 20 20 | | 1 | | | | | | | x | | | 21 | | 21 | 21 x | 21 x | 21 | 22 | x | 22 | x | x | 22 | 1 | 21 | 20 | 19 |
| 15 | 0 | 7 | 21 21 | 21 | 21 | | 1 | | | | | | | x | | | 23 | | 23 | 23 x | 23 x | 23 | 22 | x | 22 | x | x | 22 | 1 | 22 | 21 | 20 |

FIG._14.

CASE: RETURN UNCONDITIONAL
MICROCODE:
0      > SEQOPR;
1      > SEQOPR;
2      > CALLUNC, TARG=17; INHIBI: Z=10
3      > SEQOPR;
4      > SEQOPR;
5:19   > SEQOPR;
20     > RETUNC;

| CLOCK # | RETSTKO | RETSTK1 | SOPREG | R5VJADR | R4JADR | SWITCH | PCHKEN | PAUSE | VPERR | HPERR | NOP3 | NOP4 | NOP5 | TRAPADR | TRAPMET | JMPTAKEN | VC5ADRB | JC5ADRB | TADRB | HC5ADRB | TRAPMETA | JMPTAKENA | VC5ADRA | JC5ADRA | TADRA | HC5ADRA | LOADA | R3REG | R4REG | R5REG |
|---|---|---|---|---|---|---|---|---|---|---|---|---|---|---|---|---|---|---|---|---|---|---|---|---|---|---|---|---|---|---|
| 0 | 0 | 0 | x | 0 | 0 | | 1 | | | | | | | x | | | 0 | 0 | x | 0 | | | 1 | x | x | 1 | | 0 | x | x |
| 1 | 0 | 0 | x | 0 | 0 | | 1 | | | | | | | x | | | 2 | 2 | x | 2 | | | 1 | x | x | 1 | | 1 | 0 | x |
| 2 | 0 | 0 | x | 1 | 1 | | 1 | | | | | | | x | | | 2 | 2 | x | 2 | | | 16 | 16 | x | 3 | | 2 | 1 | 0 |
| 3 | 0 | 0 | x | 2 | 2 | | 1 | | | | | | | x | | | 17 | 17 | 16 | 17 | | | 16 | 16 | x | 3 | | 3 | 2 | 1 |
| 4 | 3 | 3 | x | 16 | 16 | | 1 | | | | | | | x | | | 17 | 17 | 16 | 17 | | | 18 | 18 | 16 | 18 | | 17 | 3 | 2 |
| 5 | 0 | 0 | x | 17 | 17 | | 1 | | | | | | | x | | | 19 | 19 | x | 19 | | | 18 | 18 | 16 | 18 | | 18 | 17 | 3 |
| 6 | 3 | 3 | x | 18 | 18 | | 1 | | | | | | | x | | | 19 | 19 | x | 19 | | | 20 | 20 | x | 20 | | 19 | 18 | 17 |
| 7 | 0 | 0 | x | 19 | 19 | | 1 | | | | | | | x | | | 2 | 2 | x | 21 | | | 20 | 20 | x | 20 | | 20 | 19 | 18 |
| 8 | 3 | 3 | x | 20 | 20 | | 1 | | | | | | | x | | | 2 | 2 | x | 21 | | | 3 | 3 | x | 3 | | 21 | 20 | 19 |
| 9 | 0 | 0 | x | 21 | 21 | | 1 | | | | | | | x | | | 4 | 4 | x | 4 | | | 3 | 3 | x | 3 | | 3 | 21 | 20 |
| 10 | 3 | 3 | 3 | 2 | 3 | | 1 | | | | | 1 | | x | | | 4 | 4 | x | 4 | | | 5 | 5 | x | 5 | | 4 | 3 | 21 |
| 11 | 3 | 3 | 3 | 3 | 4 | | 1 | | | | | | 1 | x | | | 6 | 6 | x | 6 | | | 5 | 5 | x | 5 | | 5 | 4 | 3 |
| 12 | 3 | 3 | 3 | 4 | 5 | | 1 | | | | | | | x | | | 6 | 6 | x | 6 | | | 7 | 7 | x | 7 | | 6 | 5 | 4 |
| 13 | 3 | 3 | 3 | 5 | 6 | | 1 | | | | | | | x | | | 8 | 8 | x | 8 | | | 7 | 7 | x | 7 | | 7 | 6 | 5 |

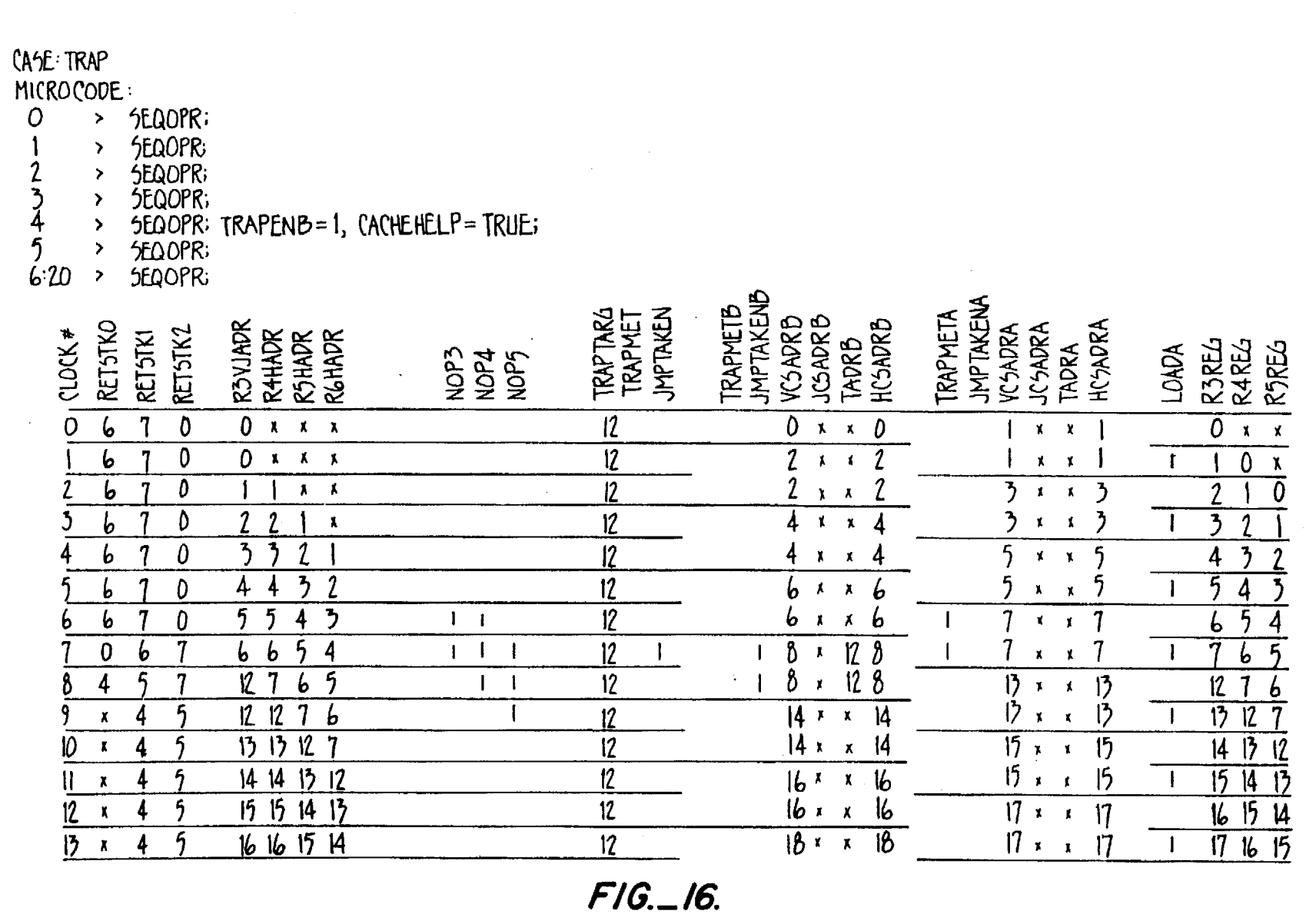

CASE: RETURN FROM TRAP (RETTRAP)
MICROCODE:
0 > SEQOPR;
1 > SEQOPR;
2 > RETTRAP;
3 > RETTRAP;
4 > SEQOPR;
5 > SEQOPR;

| CLOCK # | RETSTK0 | RETSTK1 | RETSTK2 | S0REG | R3JADR | R4HADR | R5HADR | R6HADR | NOP3 | NOP4 | NOP5 | TRAPTARG | TRAPMET | JMPTAKEN | TRAPMETB | JMPTAKENB | VC5ADRB | JC5ADRB | TADRB | HC5ADRB | TRAPMETA | JMPTAKENA | VC5ADRA | JC5ADRA | TADRA | HC5ADRA | LOADA | R3REG | R4REG | R5REG |
|---|---|---|---|---|---|---|---|---|---|---|---|---|---|---|---|---|---|---|---|---|---|---|---|---|---|---|---|---|---|---|
| 0 | 0 | 18 | x | 25 | x | x | x | x | | | | 12 | | | | | 0 | 0 | x | 0 | | | | | | | | 0 | 0 | x |
| 1 | 0 | 18 | x | 25 | 0 | x | x | x | | | | 12 | | | | | 2 | 2 | x | 2 | | 1 | 1 | 1 | x | 1 | 1 | 1 | 0 | x |
| 2 | 0 | 18 | 25 | x | 0 | 1 | x | x | | | | 12 | | | | | 2 | 2 | x | 2 | | | 3 | 3 | x | 3 | 1 | 1 | 1 | 0 |
| 3 | 18 | 25 | x | 18 | 1 | 1 | 1 | x | | | | 12 | | | | | 17 | 17 | x | 4 | | | 3 | 3 | x | 3 | 1 | 3 | 2 | 1 |
| 4 | 25 | x | x | 25 | 2 | 2 | 1 | 1 | | | | 12 | | | | 1 | 25 | 25 | x | 25 | | | 24 | 24 | x | 18 | 1 | 4 | 3 | 2 |
| 5 | 25 | x | x | 25 | 3 | 3 | 2 | 2 | | | | 12 | | | | | 25 | 25 | x | 25 | | | 24 | 24 | x | 18 | 1 | 18 | 4 | 3 |
| 6 | 25 | x | x | 25 | 24 | 18 | 4 | 3 | | | | 12 | | | | 1 | 27 | 27 | x | 27 | | | 26 | 26 | x | 26 | 1 | 25 | 18 | 4 |
| 7 | 25 | x | x | 25 | 25 | 25 | 18 | 4 | | | | 12 | | | | | 27 | 27 | x | 27 | | | 26 | 26 | x | 26 | 1 | 26 | 25 | 18 |
| 8 | 25 | x | x | 25 | 26 | 26 | 25 | 18 | | | | 12 | | | | | 29 | 29 | x | 29 | | | 28 | 28 | x | 28 | 1 | 27 | 26 | 25 |
| 9 | 25 | x | x | 25 | 27 | 27 | 26 | 25 | | | | 12 | | | | | 29 | 29 | x | 29 | | | 28 | 28 | x | 28 | 1 | 28 | 27 | 26 |

FIG. 19.

CASE: ISSUE
MICROCODE:
0 > SEQOPR;
1 > SEQOPR;
2 > SEQOPR;
3 > SEQOPR, FISSUE=1, ENTRYPT=10;
4 > SEQOPR;
5:13 > SEQOPR;
14 > SEQOPR, EPTISSUE=1, ENTRY=25;

| CLOCK# | RETSTKO | RETSTKI | PARADR | R3VLADR | RAHADR | SWITCH | PCHKEN | PAUSE | VPERR | HPERR | NOP3 | NOP4 | NOP5 | TRAPADR | TRAPMET | JMPTAKEN | TRAPMETB | JMPTAKENB | VCSADRB | JCSADRB | TADRB | HCSADRB | TRAPMETA | JMPTAKENA | VCSADRA | JCSADRA | TADRA | HCSADRA | LOADA | R3REG | R4REG | R5REG |
|---|---|---|---|---|---|---|---|---|---|---|---|---|---|---|---|---|---|---|---|---|---|---|---|---|---|---|---|---|---|---|---|
| 0 | 0 | 0 | 0 | 0 | 0 |   |   |   |   |   |   |   |   | x |   |   |   |   | 0 | 0 x | x | 0 |   |   |   |   |   |   |   |   |   | x |
| 1 | 0 | 0 | 0 | 0 | 0 |   |   |   |   |   |   |   |   | x |   |   |   |   |   |   |   |   |   |   | 1 | x | x | 1 |   | 0 |   | x |
| 2 | 0 | 0 | 1 | 1 | 1 |   |   |   |   |   |   |   |   | x |   |   |   |   | 2 | 2 x | x | 2 |   |   |   |   |   |   |   | 1 | 0 | 0 |
| 3 | 0 | 0 | 2 | 2 | 2 |   |   |   |   |   |   |   |   | x |   |   |   |   |   |   |   |   |   |   | 3 | 3 x | x | 3 | 1 | 2 | 1 | 1 |
| 4 | 0 | 0 | 3 | 3 | 3 |   | 1 |   |   |   |   |   |   | x |   |   |   |   | 9 | 9 x | x | 4 |   |   |   |   |   |   |   | 3 | 2 | 1 |
| 5 | 0 | 0 | 4 | 9 | 4 |   | 1 |   |   |   |   |   |   | x |   |   |   |   |   |   |   |   |   |   | 10 | 10 x | x | 10 | 1 | 4 | 3 | 2 |
| 6 | 0 | 0 | 10 | 10 | 10 |   | 1 |   |   |   |   |   |   | x |   |   |   |   | 11 | 11 x | x | 11 |   |   |   |   |   |   |   | 10 | 4 | 3 |
| 7 | 0 | 0 | 11 | 11 | 11 |   | 1 |   |   |   |   |   |   | x |   |   |   |   |   |   |   |   |   |   | 12 | 12 x | x | 12 | 1 | 11 | 10 | 4 |
| 8 | 0 | 0 | 12 | 12 | 12 |   | 1 |   |   |   |   |   |   | x |   |   |   |   | 13 | 13 x | x | 13 |   |   |   |   |   |   |   | 12 | 11 | 10 |
| 9 | 0 | 0 | 13 | 13 | 13 |   | 1 |   |   |   |   |   |   | x |   |   |   |   |   |   |   |   |   |   | 24 | 24 x | x | 14 | 1 | 13 | 12 | 11 |
| 10 | 0 | 0 | 14 | 24 | 14 |   | 1 |   |   |   |   |   |   | x |   |   |   |   | 25 | 25 x | x | 25 |   |   |   |   |   |   |   | 14 | 13 | 12 |
| 11 | 0 | 0 | 25 | 25 | 25 |   | 1 |   |   |   |   |   |   | x |   |   |   |   |   |   |   |   |   |   | 26 | 26 x | x | 26 | 1 | 25 | 14 | 13 |
| 12 | 0 | 0 | 26 | 26 | 26 |   | 1 |   |   |   |   |   |   | x |   |   |   |   | 27 | 27 x | x | 27 |   |   |   |   |   |   |   | 26 | 25 | 14 |
| 13 | 0 | 0 | 27 | 27 | 27 |   | 1 |   |   |   |   |   |   | x |   |   |   |   |   |   |   |   |   |   | 28 | 28 x | x | 28 | 1 | 27 | 26 | 25 |
| 14 | 0 | 0 | 28 | 28 | 28 |   | 1 |   |   |   |   |   |   | x |   |   |   |   | 29 | 29 x | x | 29 |   |   |   |   |   |   |   | 28 | 27 | 26 |

FIG. 20.

CASE: VC5 PARITY ERROR
MICROCODE:
- 0 > SEQOPR;
- 1 > SEQOPR;
- 2 > SEQOPR;
- 3 > SEQOPR, EPTISSUE=1, ENTRYPT=10;
- 10 > SEQOPR, EPTISSUE=1, ENTRYPT=20;
- 20 > SEQOPR, EPTISSUE=1, ENTRYPT=30; VC5B PERR;
- 30 > SEQOPR, EPTISSUE=1, ENTRYPT=40;

| CLOCK # | RETSTKO | RETSTK1 | PARADR | R3VJADR | R4HADR | SWITCH | PCHKEN | PAUSE | VPERR | HPERR | NOP3 | NOP4 | NOP5 | TRAPADR | TRAPMET | JMPTAKEN | TRAPMETB | JMPTKEND | VC5ADRB | JC5ADRB | TADRB | HC5ADRB | TRAPMETA | JMPTAKENA | VC5ADRA | JC5ADRA | TADRA | HC5ADRA | LOADA | R3REG | R4REG | R5REG |
|---|---|---|---|---|---|---|---|---|---|---|---|---|---|---|---|---|---|---|---|---|---|---|---|---|---|---|---|---|---|---|---|
| 0 | 0 | 0 | 0 | 0 | 0 |   |   |   |   |   |   |   |   | x |   |   |   |   | 0 | 0 x | x | 0 |   |   | — |   x | x | — |   | 0 | 0 x | x |
| 1 | 0 | 0 | 0 | 0 | 0 |   |   |   |   |   |   |   |   | x |   |   |   |   | 2 | 2 x | x | 2 |   |   | — |   x | x | — |   | — | 0 | 0 |
| 2 | 0 | 0 | 1 | 1 | 1 |   |   |   |   |   |   |   |   |   |   |   |   |   | 2 | 2 x | x | 2 |   |   | 9 | 9 x | x | 3 |   | 2 | 1 | 0 |
| 3 | 0 | 0 | 2 | 2 | 2 |   |   |   |   |   |   |   |   | x |   |   |   |   | 19 | 19 x | x | 10 |   |   | 9 | 9 x | x | 3 |   | 3 | 2 | 1 |
| 4 | 0 | 0 | 3 | 3 | 3 |   |   |   |   |   |   |   |   | x |   |   |   |   | 19 | 19 x | x | 10 |   |   | 29 | 29 x | x | 20 |   | 10 | 3 | 2 |
| 5 | 0 | 0 | 10 | 10 | 10 | 1 | — |   |   |   |   |   |   | x |   |   |   |   | 39 | 39 x | x | 30 |   |   | 29 | 29 x | x | 20 |   | 1 | 20 | 10 | 3 |
| 6 | 0 | 0 | 19 | 19 | 19 |   | — |   |   |   |   |   |   | x |   |   |   |   | 39 | 39 x | x | 30 |   |   | 19 | 19 x | x | 10 |   | 1 | 30 | 20 | 10 |
| 7 | 0 | 0 | 19 | 19 | 19 |   | — |   |   |   |   |   |   | x |   |   |   |   | 29 | 29 x | x | 20 |   |   | 19 | 19 x | x | 10 |   | 1 | 40 | 30 | 20 |
| 8 | 0 | 0 | 19 | 19 | 19 |   | — |   |   |   |   |   |   | x |   |   |   |   | 29 | 29 x | x | 20 |   |   | 30 | 30 x | x | 30 |   | 1 | 20 | 10 | 30 |
| 9 | 0 | 0 | 19 | 19 | 19 |   | — |   |   |   |   |   |   | x |   |   |   |   | 31 | 31 x | x | 31 |   |   | 30 | 30 x | x | 30 |   | 1 | 30 | 20 | 10 |
| 10 | 0 | 0 | 19 | 30 | 30 |   | — |   |   |   |   |   |   | x |   |   |   |   | 31 | 31 x | x | 31 |   |   | 32 | 32 x | x | 32 |   | 1 | 31 | 30 | 20 |
| 11 | 0 | 0 | 19 | 31 | 31 |   | — |   |   |   |   |   |   | x |   |   |   |   | 33 | 33 x | x | 33 |   |   | 32 | 32 x | x | 32 |   | 1 | 32 | 31 | 30 |
| 12 | 0 | 0 | 19 | 32 | 32 |   | — |   |   |   |   |   |   | x |   |   |   |   | 33 | 33 x | x | 33 |   |   | 34 | 34 x | x | 34 |   | 1 | 33 | 32 | 31 |
| 13 | 0 | 0 | 19 | 33 | 33 |   | — |   |   |   |   |   |   | x |   |   |   |   | 35 | 35 x | x | 35 |   |   | 34 | 34 x | x | 34 |   | 1 | 34 | 33 | 32 |

FIG. 21.

CASE: JC5 PARITY ERROR
MICROCODE:
0 > SEQOPR;
1 > SEQOPR;
2 > SEQOPR;
3 > CALLCOND, TARG=6, CONDITION=TRUE;
4 > SEQOPR;
8 > SEQOPR; JC5A PERR
9 > SEQOPR;
10 > SEQOPR;

| CLOCK# | RET5TKO | RET5TK1 | PARADR | R3VJADR | R4HADR | SWITCH | PCHKEN | PAUSE | VPERR | HPERR | NOP3 | NOP4 | NOP5 | TRAPADR | TRAPMET | JMPTAKEN | TRAPMETB | JMPTAKENB | VC5ADRB | JC5ADRB | TADRB | HC5ADRB | TRAPMETA | JMPTAKENA | VC5ADRA | JC5ADRA | TADRA | HC5ADRA | LOADA | R3REG | R4REG | R5REG |
|---|---|---|---|---|---|---|---|---|---|---|---|---|---|---|---|---|---|---|---|---|---|---|---|---|---|---|---|---|---|---|---|
| 0 | 0 | 0 | 0 | 0 | 0 | | 1 | | | | | | | x | | | 0 | | 0 | x | x | 0 | | | | x | x | 1 | | 0 | x | x |
| 1 | 0 | 0 | 0 | 0 | 0 | | 1 | | | | | | | x | | | 2 | | 2 | x | x | 2 | | | 1 | x | x | 1 | | 1 | 0 | x |
| 2 | 0 | 0 | 1 | 1 | 1 | | 1 | | | | | | | x | | | 2 | | 2 | x | x | 2 | | | 3 | x | x | 3 | | 2 | 1 | 0 |
| 3 | 0 | 0 | 2 | 2 | 2 | | 1 | | | | | | | x | | | 4 | | 4 | x | x | 4 | | | 3 | x | x | 3 | | 3 | 2 | 1 |
| 4 | 4 | 0 | 3 | 3 | 3 | | 1 | | | | | | | x | | | 4 | | 4 | x | x | 4 | | | 5 | 8 | x | 5 | | 4 | 3 | 2 |
| 0 | 0 | 4 | 4 | 4 | 4 | | 1 | | | | | | | x | | | 6 | 8 | 6 | | | | | 5 | 8 | x | 5 | 1 | 5 | 4 | 3 |
| 4 | 0 | 4 | 5 | 8 | 5 | 1 | 1 | | | | | | | x | | 1 | 6 | 8 | 6 | | | | | 9 | x | x | 9 | 1 | 6 | 5 | 4 |
| 4 | 0 | 4 | 8 | 8 | 8 | 1 | 1 | 1 | | | | | | x | | 1 | 5 | | 7 | x | x | 5 | | | 9 | x | x | 9 | 1 | 8 | 6 | 5 |
| 4 | 0 | 4 | 8 | 9 | 9 | | 1 | 1 | | | | | | x | | | 5 | | 7 | x | x | 5 | | | 8 | x | x | 8 | 1 | 9 | 8 | 7 |
| 0 | 0 | 4 | 8 | 7 | 5 | | | 1 | | | | | | x | | | 9 | | 9 | x | x | 9 | | | 8 | x | x | 8 | 1 | 8 | 9 | 8 |
| 2 | 0 | 4 | 8 | 8 | 8 | | 1 | | | | | | | x | | | 11 | | 11 | x | x | 11 | | | 10 | x | x | 10 | 1 | 9 | 8 | 9 |
| 3 | 0 | 4 | 8 | 9 | 9 | | 1 | | | | | | | x | | | 11 | | 11 | x | x | 11 | | | 10 | x | x | 10 | 1 | 10 | 9 | 10 |
| 4 | 0 | 4 | 8 | 10 | 10 | | 1 | | | | | | | x | | | 13 | | 13 | x | x | 13 | | | 12 | x | x | 12 | 1 | 11 | 10 | 11 |
| 4 | 0 | 4 | 8 | 11 | 11 | | 1 | | | | | | | x | | | 13 | | 13 | x | x | 13 | | | 12 | x | x | 12 | 1 | 12 | 11 | 12 |
| 4 | 0 | 4 | 8 | 12 | 12 | | 1 | | | | | | | x | | | 15 | | 15 | x | x | 15 | | | 14 | x | x | 14 | 1 | 13 | 12 | 11 |
| 4 | 0 | 4 | 8 | 13 | 13 | | 1 | | | | | | | x | | | 15 | | 15 | x | x | 15 | | | 14 | x | x | 14 | 1 | 14 | 13 | 12 |

FIG. 22.

CASE: HC5 PARITY ERROR
MICROCODE:
0   > SEQOPR:
1   > SEQOPR:
2   > CALLUNC, TARG=17;
3   > SEQOPR, HC5A PERR:
4   > SEQOPR:
5:19 > SEQOPR:
20  > RETUNC:

| CLOCK # | RETSTKO | RETSTK1 | PARADR | R3JADR | R4HADR | SWITCH | PCHKEN | PAUSE | VPERR | HPERR | NOP3 | NOP4 | NOP5 | TRAPADR | TRAPMET | JMPTAKEN | TRAPMETB | JMPTAKENB | VC5ADRB | JC5ADRB | TAPRB | HC5ADRB | TRAPMETA | JMPTAKENA | VC5ADRA | JC5ADRA | TAPRA | HC5ADRA | LOADA | R3REG | R4REG | R5REG |
|---|---|---|---|---|---|---|---|---|---|---|---|---|---|---|---|---|---|---|---|---|---|---|---|---|---|---|---|---|---|---|---|---|
| 0 | 0 | 0 | 0 | 0 | 0 |   |   |   |   |   |   |   |   | x |   |   |   |   | 0 | x | x | 0 |   |   |   |   |   |   |   | 0 | x | x |
| 1 | 0 | 0 | 0 | 0 | 0 |   | 1 |   |   |   |   |   |   | 1 |   |   |   |   | 2 | x | x | 2 |   |   | 1 | x | x | 1 | 1 | 1 | 0 | x |
| 2 | 0 | 0 | 1 | 1 | 1 |   | 1 | 1 |   |   |   |   |   | x |   |   |   |   | 2 | x | x | 2 |   |   | 1 | x | x | 1 | 1 | 2 | 1 | 0 |
| 3 | 0 | 0 | 2 | 2 | 2 |   | 1 | 1 |   |   |   |   |   | x |   |   |   |   | 17 | 17 | x | 17 |   |   | 3 | x | x | 3 | 1 | 3 | 2 | 1 |
| 4 | 3 | 0 | 3 | 16 | 3 | 1 | 1 | 1 |   |   |   |   |   | x |   |   |   |   | 17 | 16 | x | 17 |   |   | 3 | x | x | 3 | 1 | 17 | 5 | 2 |
| 5 | 0 | 3 | 3 | 17 | 17 | 1 | 1 | 1 |   |   |   |   |   | x |   |   |   |   | 16 | x | x | 3 |   |   | 18 | x | 16 | 18 | 1 | 18 | 17 | 3 |
| 6 | 0 | 3 | 3 | 18 | 18 | 1 |   | 1 |   |   |   |   |   | x |   |   |   |   | 16 | x | x | 3 |   |   | 18 | x | 16 | 18 | 1 | 19 | 18 | 17 |
| 7 | 0 | 3 | 3 | 16 | 3 |   | 1 |   |   |   |   |   |   | x |   |   |   |   | 18 | 18 | x | 18 |   |   | 17 | x | x | 17 | 1 | 17 | 3 | 18 |
| 8 | 0 | 3 | 3 | 17 | 17 |   | 1 |   |   |   |   |   |   | x |   |   |   |   | 18 | 18 | x | 18 |   |   | 17 | x | x | 17 | 1 | 18 | 17 | 3 |
| 9 | 0 | 3 | 3 | 18 | 18 |   |   |   |   |   |   |   |   | x |   |   |   |   | 20 | 20 | x | 20 |   |   | 19 | x | x | 19 | 1 | 19 | 18 | 17 |
| 10 | 0 | 3 | 3 | 19 | 19 |   | 1 |   |   |   |   |   |   | x |   |   |   |   | 20 | 20 | x | 20 |   |   | 19 | x | x | 19 | 1 | 20 | 19 | 18 |
| 11 | 0 | 3 | 3 | 20 | 20 |   | 1 |   |   |   |   |   |   | x |   |   |   |   | 3 | x | x | 3 |   |   | 21 | x | x | 21 | 1 | 21 | 20 | 19 |
| 12 | 3 | 0 | 3 | 2 | 21 |   | 1 |   |   |   |   |   |   | x |   |   |   |   | 3 | x | x | 3 |   |   | 21 | x | x | 21 | 1 | 3 | 21 | 20 |
| 13 | 3 | 0 | 3 | 5 | 5 |   | 1 |   |   |   |   |   |   | x |   |   |   |   | 5 | x | x | 5 |   |   | 4 | x | x | 4 | 1 | 4 | 5 | 21 |

MICROINSTRUCTION SEQUENCER HAVING MULTIPLE CONTROL STORES FOR LOADING DIFFERENT RANK REGISTERS IN PARALLEL

This is a continuation of application Ser. No. 07/441,789, filed Nov. 27, 1989, now abandoned.

BACKGROUND OF THE INVENTION

The invention relates generally to digital electronic systems and, more particularly, to an architecture for a microinstruction sequencer of a Central Processing Unit (CPU).

Digital system designers are continually attempting to maximize the speed of computer systems and circuits. One particular system of interest is a CPU control store which stores control information in the form of microinstructions. One, or more, microinstructions are executed to implement one machine (macro) instruction.

The memory elements utilized in the control store are characterized by an access time. The magnitude of this access time may restrict the speed of operation of the CPU.

One previous method of overcoming this speed restriction is to utilize an interleaved memory system. Several slow memory banks are grouped so that every sequential fetch comes from the next memory bank. Thus, the access time for a given instruction overlaps the readout time of the previous instruction.

The various banks of an interleaved memory system may be implemented on a single RAM or on multiple RAMs. Typically, the address (ADR) space of the instruction set is distributed over the memory banks. For example, the nth instruction may be stored at ADR(n) in a given memory bank and the (n+1)th instruction may be stored at ADR(n) in the succeeding memory bank. In this example, one memory bank stores even lines of microinstruction and the other memory bank stores odd lines of microinstruction. This distribution of the address space over the memory banks either requires restrictions on the possible branches in the instruction set or reduces the speed of execution of the branches.

Another problem inherent in the use of a control store is the occurrence of soft or hard errors in the RAMS. Generally, upon detecting errors the control store access system must either halt or implement an error correction routine that takes many machine cycles to complete. This error correction function degrades the speed of operation of the CPU.

Accordingly, a control store that allows for fast access to an instruction set is needed in high-speed computer systems. Further, the ability of the control store to quickly correct for hard or soft errors in an instruction is greatly needed.

SUMMARY OF THE INVENTION

The present invention is a high speed microinstruction sequencer which minimizes hardware, which allows for two cycle RAM access without performance penalties, which allows for retries upon control store parity errors, and which allows for branching which could not be performed in known systems. In one embodiment of the present invention, first and second banks of control stores are used to store microinstructions. Each bank contains three control stores: A horizontal control store, a vertical control store, and a jump control store. The horizontal control store contains the rank four microcode; the vertical control store contains the rank three microcode; and the jump control store contains the same microcode as the vertical control store but is used on conditional jump microoperations. In one embodiment of the invention, the contents of the vertical control store are logically offset from their original address by 1 whereas the contents of the horizontal control store and the jump control store are aligned with their original address. In another embodiment, the contents of the horizontal control store and the jump control store are offset from their original addresses by one, whereas the contents of the vertical control store are aligned with their original addresses. This allows simultaneous accessing of different microinstructions using a single address incrementer. The control store banks are accessed in an overlapping manner so that upon each clock cycle one bank is loading the rank 3 and rank 4 registers. The contents of the two banks are the same to provide soft error coverage and recovery.

The sequencer according to the present invention includes a return address stack for returning from subroutine calls and trap routines. When processing trap routines, the return address stack stores two microinstruction addresses to allow processing of a previously encountered jump or call operation that may have been aborted when the trap routine was entered.

BRIEF DESCRIPTION OF THE DRAWINGS

FIG. 1 is a block diagram of a computing system including a particular embodiment of a microinstruction sequencer according to the present invention.

FIG. 2 is a diagram showing macroinstruction and microinstruction pipelines according to the present invention.

FIG. 3 is a diagram showing microinstruction pipelining for vari us macroinstructions.

FIG. 4 is a block diagram of a particular embodiment of a microinstruction sequencer according to the present invention.

FIG. 5 is a diagram showing the organization of the vertical control store, horizontal control store, and jump control sto cording to the present invention.

FIG. 6 is a timing diagram showing a particular embodiment of control store timing according to the present invention.

FIG. 7 is ablock diagram showing production of jump related signals according to the present invention.

FIG. 8 is a timing diagram showing production of parity error processing signals according to the present invention.

FIG. 9 is a block diagram showing production of trap related signals according to the present invention.

FIGS. 10–22 are examples of circuit operation according to the present invention.

DETAILED DESCRIPTION OF THE PREFERRED EMBODIMENTS OVERVIEW

FIG. 1 is a block diagram of a particular embodiment of a central processing unit or computing system 10 according to the present invention. Computing system 10 includes a macroinstruction processing unit (IPU) 14 for storing and fetching macroinstructions, a microinstruction sequencer 22 for generating microinstructions corresponding to the macroinstructions stored in IPU 14, and a data processing unit (DPU) 26 for storing and processing data in response to instructions from IPU 14 and microinstruction sequencer 22. Microinstruction sequencer 22 communicates with IPU 14 and DPU 26 over an IFU-sequencer bus 30 and a DPU-sequencer bus 36, respectively. IPU 14 communicates with DPU 26 over an IPU-DPU bus 37.

In computing system 10, each macroinstruction may be expanded into one or more microinstructions. It is the microinstructions which are actually executed by DPU 26 to achieve the desired program result. Thus, the macroinstructions are actually control fields which control the retrieval and execution of the microinstructions.

In the past, each instruction was executed to completion before execution of a succeeding instruction was begun. However, modern day computers use the technique of pipelining to maximize the number of instructions which may be executed by DPU 26 in a given amount of time. In pipelining, instruction execution is broken down into one or more discrete ranks, or stages, of execution so that multiple instructions may be executed in different ranks at the same time. For example, DPU 26 may begin the execution of a second microinstruction in rank four while a first microinstruction is waiting in rank three.

An example of macroinstruction and microinstruction pipelining is shown in FIG. 2. As shown in FIG. 2, macroinstruction execution may be broken down into six ranks, termed rank 0 through rank 5. Each macroinstruction rank may comprise one or more clock cycles. In the simplest case, when only one microinstruction corresponds to a given macroinstruction, then each rank corresponds to one clock cycle. In the single microinstruction case, rank 0 may correspond, e.g., to macroinstruction decoding by IPU 14 together with the determination of the address of the microinstruction corresponding to the macroinstruction. During ranks 1, 2 and 3, the microinstruction corresponding to the macroinstruction is retrieved by microinstruction sequencer 22. During rank 3, the data needed to execute the microinstruction is fetched from memory. During rank 4, the arithmetic and logic operations on the data are performed by DPU 26, and in rank 5 the results of the operation are stored in the appropriate places in memory.

Microinstructions also are executed in a pipelined manner. FIG. 2 shows a microinstruction pipeline containing 5 stages, termed rank 1 through rank 5. When there is only one microinstruction per macroinstruction, then each rank in the microinstruction pipeline corresponds to a rank in the macroinstruction pipeline as noted above. However, when more than one microinstruction is associated with a macroinstruction, then there is not necessarily a one-to-one correspondence between the macroinstruction ranks and the microinstruction ranks. This shall be illustrated below.

To account for the possibility that a macroinstruction may have either one microinstruction or a plurality of microinstructions associated therewith, a synchronizing/handshake mechanism is used to control macro/microinstruction execution. In operation, the first macroinstruction is decoded, and the address of the first microinstruction corresponding to the macroinstruction (the entry point address) is provided to microinstruction sequencer 22. IPU 14 provides an EPT-issue signal to microinstruction sequencer 22 (e.g., during rank 1) to initiate microinstruction processing. If only one microinstruction corresponds to the macroinstruction, then the next macroinstruction is decoded, and the EPT-issue signal is automatically generated during rank 1 execution of the current macroinstruction is complete which is used to select the entry point generated fro the first microinstruction of the next macroinstrucion. If the macroinstruction expands into a plurality of microinstructions, then the EPT-issue signal is not automatically generated. Instead, when execution of the series of microinstructions is nearly complete, the microinstruction sequencer 22 provides a F-issue signal to IPU 14 so that IPU 14 may provide the entry point address for the first microinstruction of the next macroinstruction. No EPT-issue signal is generated until another single-microinstruction macroinstruction is encountered.

FIG. 3 is a diagram showing the relationship between the macroinstruction pipeline and the microinstruction pipeline for 4 families of macroinstructions A, B, C and D. Macroinstructions A, B, C and D are expanded into 1, 2, 3, and 1 associated microinstructions, respectively. The microinstructions of each family are indicated by the suffix following the letter. As shown in FIG. 3, macroinstruction A takes 6 clock cycles to execute, since it has only one microinstruction (A0) associated therewith. An EPT-issue signal is generated during rank 1 of macroinstruction A, the address of microinstruction B0 is supplied to microinstruction sequencer 22, and microinstruction B0 begins execution. Because macroinstructions B and C have multiple microinstructions associated with them, it takes longer to execute them. For example, macroinstruction B takes 7 clock cycles to execute, and macroinstruction C takes 8 clock cycles to execute (not counting the extra clock cycles in rank 0). Microinstruction sequencer 22 automatically increments the entry point address for accessing the remaining microinstructions in each sequence.

In this embodiment, the F-issue signal is issued by microinstruction sequencer 22 during the penultimate (second to last) microinstruction in each sequence of microinstructions during rank 2. Thus, the F-issue signal is issued during rank 2 of microinstruction B0 of macroinstruction B and during rank 2 of microinstruction C1 of macroinstruction C. F-issue causes sequencer 22 to select the entry point address provided by IPU 14 as the address of the next microinstruction to be executed (rather than the address formed by incrementing the previous entry point address). It also instructs IPU 14 to advance the macroinstruction queue. It should be noted that a new microinstruction begins execution in rank 1 immediately after the previous microinstruction sequence has completed its rank 1 execution. The various ranks of microinstruction execution shall be discussed in more detail below.

MICROINSTRUCTION SEQUENCER

FIG. 4 is a block diagram showing a particular embodiment of microinstruction sequencer 22 according to the present invention. Microinstruction sequencer 22 comprises two banks of control store arrays, termed a first bank 126 and a second bank 130. First bank 126 includes a horizontal control store-A(HCSA)102, a vertical control store-A (VCSA)106, and a jump control store-A(JCSA)110. Second bank 130 includes a jump control store-B(JCSB)114, a vertical control store-B(VCSB)118, and a horizontal control store-B(HCSB)122. The function of the two banks shall be discussed below.

The control stores contain portions of microinstructions for each macroinstruction. The vertical control stores (VCSA 106 and VCSB 118) contain the portion of each microinstruction (48 bits) that will be executed in rank 3. The jump control stores (JCSA 110 and JCSB 114) contain the same microinstruction as the vertical control stores, and they are used for retrieving the target microinstruction when executing conditional jump microinstructions. The jump control stores are accessed in parallel with the vertical control stores of the same bank with the target address of a microinstruction to be executed if the tested condition is met. If the condition is in fact met, then the portion of the microinstruction is retrieved from the JCS; otherwise the portion of the microinstruction is retrieved from the VCS. The horizontal control stores (HCSA 102 and HCSB 122)

contain the portion of each microinstruction (112 bits) that will be executed in rank 4. The contents of HCSA 102, VCSA 106, and JCSA 110 are identical to HCSB 122, VCSB 118, and JCSB 114 respectively, for reasons discussed below.

FIG. 5 is a diagram showing one embodiment of the organization of a horizontal control store (HCS), vertical control store (VCS), and jump control store (JCS) according to the present invention. In the embodiment shown, the contents of each row in the horizontal control stores and the jump control stores are logically offset from their original addresses by 1, but the contents of each row in the vertical control stores are aligned with their corresponding addresses. In another embodiment, the contents of each row in the vertical control stores are offset from their original addresses by one, and the contents of each row in the horizontal control stores and the jump control stores are aligned with their corresponding addresses. The reasons for this offset scheme are discussed below.

Each control store has a spare RAM for hard error recovery. Thus, HCSA 102, VCSA 106 and JCSA 110 in first bank 126 each have spare RAMS 136, 138 and 140 respectively. Similarly, JCSB 114, VCSB 118 and HCSB 122 each have spare RAMS 146, 148 and 150 respectively. Spare RAMS 136 and 150 associated with HCSA 102 and HCSB 122, respectively, are coupled to an HCS-SP bus 162 through buses 164 and 166, respectively. HCSA 102 and HCSB 122 are coupled to an HCS bus 167 through buses 168 and 170 respectively. The F-issue signal originates from VCS address input bus 184, and it is communicated to IPU 14 over an F-issue line 171. Spare RAMS 138 and 148 associated with VCSA 106 and VCSB 118, respectively, are coupled to a VCS-SP bus 174 through buses 178 and 180 respectively. VCSA 106 and VCSB 118 are coupled to a VCS address input bus 184 through buses 186 and 188 respectively. Spare RAMS 140 and 146 associated with JCSA 110 and JCSB 114, respectively, are coupled to a JCS-SP bus 192 through buses 196 and 198. JCSA 110 and JCSB 114 are coupled to a JCS bus 202 through buses 206 and 208 respectively. The outputs of HCSA 102, VCSA 106 and JCSA 110 are enabled by LOAD-A signals received on LOAD-A lines 154. The outputs of JCSB 114, VCSB 118 and HCSB 122 are enabled by LOAD-B signals received on LOAD-B lines 158. The LOAD-B signals are the inverse of the LOAD-A signals.

VCS-SP bus 174 is coupled to a VCS spare IO bus 214 which, in turn is coupled to a VCS spare input buffer 216 and a VCS spare output buffer 218. Similarly, JCS-SP bus 192 is coupled to a JCS spare IO bus 224 which, in turn is coupled to a JCS spare input buffer 226 and a JCS spare output buffer 228. VCS spare output buffer 218 and JCS spare output buffer 228 are coupled to the 0 and 1 input terminals, respectively of a VCS/JCS spare multiplexer 232. VCS spare input buffer 216 and JCS spare input buffer 226 are used for writing into the VCS and JCS spare RAMS.

VCS address input bus 184 is coupled to a VCS IO bus 240 which, in turn is coupled to a VCS input buffer 244 and a VCS output buffer 246. Similarly, JCS bus 202 is coupled to a JCS IO bus 250 which, in turn is coupled to a JCS input buffer 254 and a JCS output buffer 256. VCS output buffer 246 and JCS output buffer 256 are coupled to the 0 and 1 input terminals of a VCS/JCS output multiplexer 260. JCS input buffer 244 and VCS input buffer 254 are used for writing into the VCS and JCS arrays.

Multiplexers 232 and 260 are controlled by a JMPTAKEN signal received on a JMPTAKEN line 268. The output terminal of VCS/JCS spare output multiplexer 232 is coupled to latches 272, and the output terminal of VCS/JCS output multiplexer 260 is coupled to latches 276. Although only one box is shown schematically for each set of latches, it is known by those of ordinary skill in the art that these and other latches, registers, and storage elements may comprise one or more components depending on the number of input/output terminals or storage locations needed. Latches 272 and 276 are enabled by a latch enable signal received on a latch enable line 280. The output terminals of latches 272 and 276 are coupled to the input terminals of sparing logic 284 which determines whether the microinstructions come from either the VCS, the JCS or their spares. The selected portion of the microinstruction is communicated to a rank 3 register 288 over a rank 3 input bus 292.

HCS-SP bus 162 is coupled to a HCS spare IO bus 300 which, in turn is coupled to an HCS spare input buffer 304 and an HCS spare output buffer 306. HCS spare input buffer 304 is used for writing into the HCS spare RAMS. HCS bus 167 is coupled to a HCS IO bus 318 which, in turn, is coupled to an HCS output buffer 322 and an HCS input buffer 324. HCS input buffer 324 is used for writing into the HCS arrays. HCS spare output buffer 306 and HCS output buffer 322 have their output terminals coupled to the input terminals of HCS sparing logic 30 which selects the HCS microinstruction from either the HCS or their spares. The selected portion of the microinstruction is communicated to latches 334 which are controlled by the latch enable signals on latch enable line 280. The output terminals of latches 334 are coupled to a rank 4 register 340 through a rank 4 input bus 344. Additionally, the rank 4 data is communicated to a rank 5 register 354 over a rank 5 input bus 358.

The control stores in first bank 126 and second bank 130 are addressed by a first addressing circuit 362 and a second addressing circuit 366, respectively. First addressing circuit 362 includes an HCSA multiplexer 370 coupled to HCSA 102 and HCSA spare RAM 136 through a HCSA address bus 378, a VCSA multiplexer 382 coupled to VCSA 106 and VCSA spare RAM 138 through a VCSA address bus 386, and a JCSA address multiplexer 390 coupled to JCSA 110 and JCSA spare RAM 140 through a JCSA address bus 394.

The 00 input terminal of HCSA address multiplexer 370 is coupled to a HCSADRA register 398 through an HCSADRA bus 402; the 01 input terminal of HCSA address multiplexer 370 is coupled to a TADRA register 406 through a TADRA bus 410; and the 1X input terminal of HCSA address multiplexer 370 is coupled to a TRAPTARG bus 418 for receiving trap addresses therefrom. HCSADRA register 398 receives HCS addresses from an HCS multiplexer 430 over an HCS address input bus 434. TADRA register 406 receives target addresses over a target address bus 436 which originates from second addressing circuit 366. TRAPTARG bus 418 is coupled to combinational logic 422 which, in turn, is coupled to a R5TRAPCASE output bus 425 and to a TRAPADR output bus 426. TRAPADR output bus 426 is coupled to a TRAPADR register 414. TRAPADR register 414 is coupled to a trap input multiplexer 437 through a trap input bus 438. The 0 input terminal of trap input multiplexer 437 is coupled to a SHBUS 439 for receiving trap addresses from DPU 26. The 1 input terminal of trap input multiplexer 437 is coupled to HCS address input bus 434. Trap input multiplexer 437 is controlled by USETRREG signals received over an USETRREG line 441. R5TRAPCASE output bus 425 is coupled to a R5TRAPCASE register 702 which, in turn, is coupled to a R4TRAPCASE register 700 through a R4TRAPCASE output bus 701. R4TRAPCASE register 700 is coupled to a R3LTRAPCASE bus 703 which, in turn, is coupled to rank 4 input bus 344 for receiving the contents of a TRAPCASE field in the portion of the microinstruction being communicated to rank 4 register 340.

HCS multiplexer 370 is controlled by USETRREG and JMPCNTA signals received over USETRREG line 440 and JMPCNTA line 444 respectively. The address in HCSADRA register 398 is selected when both USETRREG and JMPCNTA are low; the address in TADRA register 406 is selected when USETRREG is low and JMPCNTA is high, and the address in TRAPADR register 414 is selected when USETRREG is high regardless of the value of JMPCNTA.

The 00 input terminal of VCSA multiplexer 382 is coupled to a VCSADRA register 448 through a VCSADRA bus 452; the 01 input terminal VCSA multiplexer 382 is coupled to TADRA register 406 through bus 410; and the 1X input terminal of VCSA multiplexer 382 is coupled to TRAPADR register 414 through TRAPTARG bus 418. VCSADRA register 448 receives VCS addresses from a VCS multiplexer 468 over a VCS address input bus 472.

VCSA multiplexer 382 is also controlled by the USETRREG and JMPCNTA signals received over lines 440 and 444 respectively. Thus, the address in VCSADRA register 448 is selected when both USETRREG and JMPCNTA are low; the address in TADRA register 406 is selected when USETRREG is low and JMPCNTA is high; and the address in TRAPADR register 414 is selected when USETRREG is high regardless of the value of JMPCNTA.

The 0 input terminal of JCSA multiplexer 390 is coupled to a JCSADRA register 456 through a JCSADRA bus 460, and the 1 input terminal of JCSA multiplexer 390 is coupled to TRAPADR register 414 through trap bus 418. JCSADRA register 456 receives addresses from a JCSADRA multiplexer 476 over a JCSADRA bus 480. The 1 input terminal of JCSADRA multiplexer 476 is coupled to TADRA register 406 through TADRA bus 410. The 0 input terminal of JCSADRA multiplexer 476 is coupled to a R3TARG bus 484 which, in turn, is coupled to rank 3 output bus 350 through a parity generator 488. R3TARG bus 484 contains the target address contained in the Rank 3 portion of the microinstruction. JCSADRA multiplexer is controlled by SWITCH signals received over a SWITCH line 490. Thus, the rank 3 target address from rank 3 register 288 is selected when SWITCH is low, and the address in TADRA register 406 is selected when SWITCH is high.

JCSA multiplexer 390 is controlled by TRAPCNTA signals received over a TRAPCNTA line 464. Thus, the address in JCSADRA register 456 is selected when TRAPCNTA is low, and the address in TRAPADR register 414 is selected when TRAPCNTA is high.

Second addressing circuit 366 includes a JCSB multiplexer 492 coupled to JCSB 114 and JCSB spare RAM 146 through a JCSB address bus 496, a VCSB multiplexer 500 coupled to VCSB 118 and VCSB spare RAM 148 through a VCSB address bus 504, and an HCSB multiplexer 508 coupled to HCSB 122 and HCSB spare RAM 150 through a HCSB address bus 512.

The 0 input terminal of JCSB multiplexer 492 is coupled to a JCSADRB register 516 through a JCSADRB bus 520, and the 1 input terminal of JCSB multiplexer 492 receives trap addresses from TRAPADR register 414 trap bus 418. JCSADRB register 516 receives addresses from a JCSADRB multiplexer 554 over a JCSADRB bus 558. The 0 input terminal of JCSADRB multiplexer 554 is coupled to R3TARG line 484, and the 1 input terminal of JCSADRB multiplexer 554 is coupled to TADRB bus 540. JCSADRB multiplexer 554 also is controlled by the SWITCH signals on SWITCH line 490. Thus, the rank 3 target address from rank 3 register 288 is selected when SWITCH is low, and the address from TADRB register 536 is selected when SWITCH is high.

JCSB multiplexer 492 is controlled by a TRAPCNTB signal received over an TRAPCNTB line 524. Thus, the address in JCSADRB register 516 is selected when TRAPCNTB is low, and the address in TRAPADR register 414 when TRAPCNTB is high.

The 00 input terminal of VCSB multiplexer 500 is coupled to a VCSADRB register 528 through a VCSADRB bus 532; the 01 input terminal of VCSB multiplexer 500 is coupled to a TADRB register 536 through TADRB bus 540; and the 1X input terminal of VCSB multiplexer 500 is coupled to TRAPADR register 414 through trap bus 418. VCSADRB register 528 receives VCS addresses from VCS multiplexer 468 over VCS address input bus 472.

VCSB multiplexer 500 is controlled by the USETRREG signals on USETRREG line 440 and by JMPCNTB signals received over JMPCNTB line 533. Thus, the address in VCSADRB register 528 is selected when both USETRREG and JMPCNTB are low; the address in TADRB register 536 is selected when USETRREG is low and JMPCNTB is high; and the trap address in TRAPADR register 414 is selected whenever USETRREG is high regardless of the value of JMPCNTB.

The 00 input terminal of HCSB address multiplexer 508 is coupled to an HCSADRB register 546 through a HCSADRB bus 550; the 01 input terminal of HCSB address multiplexer 508 is coupled to TADRB register 536 through TADRB bus 540; and the 1X input terminal of HCSB address multiplexer 508 is coupled to TRAPADR register 414 through trap bus 418. TADRB register 536 is coupled to JCSA address bus 394. HCSADRB register 546 is coupled to HCS address input bus 434.

HCSB address multiplexer 508 also is controlled by the USETRREG and JMPCNTB signals received over lines 440 and 533, respectively. Thus, the address in HCSADRB register 546 is selected when both USETRREG and JMPCNTB are low; the address in TADRB register 536 is selected when USETRREG is low and JMPCNTB is high; and the address in TRAPADR register 414 is selected when USETRREG is high regardless of the value of JMPCNTB.

The HCS addresses on HCSA address bus 378 and HCSB address bus 512 are coupled to the 1 and 0 input terminals, respectively, of a R3HADR multiplexer 562. R3HADR multiplexer 562 is controlled by LOAD-A signals received over LOAD-A line 154. Thus, the HCS address applied to HCSA 102 is selected when LOAD-A is high, and the HCS address applied to HCSB 122 is selected when LOAD-A is low. The selected HCS address is communicated to a R4HADR register 566 and to an input terminal of a return stack input multiplexer 570 over a R3HADR output bus 574. The address in R4HADR register 566 is communicated to a R5HADR register 578 and to HCS multiplexer 430 over a R4HADR output bus 588. The address in R5HADR register 578 is communicated to a R6HADR register 592 and to a location 1 in return stack 596 over a R5HADR output bus 600. The address in R6HADR register 592 is communicated to the 0 input terminal of a parity error address multiplexer 604 and to another input terminal of return stack input multiplexer 570 through a R6HADR output bus 608.

A third input terminal of return stack input multiplexer 570 is coupled to SHBUS 439. The output terminal of return stack input multiplexer 570 is coupled to location 0 of return stack 596 through a multiplexer-stack bus 597. Return stack input multiplexer 570 communicates either the contents of SHBUS 439, R6HADR output bus 608, or R3HADR output bus 574 to location 0 of return stack 596 in response to CALLCNT signals received over CALLCNT line 599.

The return stack 596 is a last-in, first-out (LIFO) memory, capable of storing five addresses (16 bits wide), at stack locations 0 through 4. The return stack 596 is circular in that addresses are "pushed" onto the stack at location 0, and subsequent pushes of addresses will correspondingly move the first address through return stack locations 1, 2, 3 and 4, and back to location 0. When retrieving addresses from the return stack 596, location 1 forms the top of the stack.

As noted above, the addresses supplied to HCSADRA register 398 and HCSADRB register 546 originate from HCS multiplexer 430, the 1 input terminal of which is coupled to R4HADR output bus 588. The 0 input terminal of HCS multiplexer is coupled to the output terminal of an incrementer 620 through an incrementer output bus 628. Incrementer 620 receives addresses from an incrementer address multiplexer 612 over an incrementer input bus 624. Incrementer 620 increments the received address by one and communicates the incremented address to HCS multiplexer 430.

The 00 input terminal of incrementer address multiplexer 612 is coupled to VCSA address bus 386; the 01 input terminal of incrementer address multiplexer 612 is coupled to VCSB address bus 504; and the 1X input terminal of incrementer address multiplexer 612 is coupled to TRAPTARG bus 418. Incrementer address multiplexer 612 is controlled by USETRREG and LOAD-A signals received on USETRREG line 440 and LOAD-A line 154. Thus, the address from VCSA address bus 386 is selected when USETRREG is low and LOAD-A is low; the address from VCSB address bus 504 is selected when USETRREG is low and LOAD-A is high; and the address from TRAPTARG bus 418 is selected when USETRREG is high irrespective of the state of LOAD-A.

The 0 input terminal of a VCS/JCS address multiplexer 616 is connected to VCSA address bus 386; the 1 input terminal of VCS/JCS address multiplexer 616 is coupled to VCSB address bus 504; the 2 input terminal of multiplexer 616 is coupled to JCSA address bus 394; and the 3 input terminal of multiplexer 616 is coupled to JCSB address bus 496. VCS/JCS address multiplexer 616 is controlled by JMPTAKEN and LOAD-B signals received on a JMPTAKEN line 617 and LOAD-B line 158. Thus, the address from VCSA address bus 386 is selected when both JMPTAKEN and LOAD-B are low; the address from VCSB address but 504 is selected when JMPTAKEN is low and LOAD-B is high; the address from JCSA address bus 394 is selected when JMPTAKEN is high and LOAD-B is low; and the address from JCSB address bus 496 is selected when both JMPTAKEN and LOAD-B are high. The selected address is communicated to a R3VJADR register 632 over a R3VJADR input bus 636. The address stored in R3VJADR register 632 then is communicated to the 1 input terminal of parity error address multiplexer 604, to the 1 input terminal of return stack output multiplexer 586, and to the 1 input terminal of a decrementer output multiplexer 644.

Parity error address multiplexer 604 communicates addresses to a CSPARADR register 629 over a CSPARADR input bus 630. The address contained in CSPARADR register 629 represents a control store address for a microinstruction which has a parity error. Parity checking, predicting, and generating are performed by parity check circuits (PC), parity generators (PG) and parity check/predict circuits (PC/P) located as shown in FIG. 4. The address in CSPARADR register 629 is made available to DPU 26 through SHBUS 439 to identify the control store location with the parity error. As discussed above, this address may come from either R6HADR register 592 or R3VJADR register 632. Which address is communicated to CSPARADR register 629 is determined by R3PERR signals received over a R3PERR line 631. The address from R6HADR register 592 is selected when R3PERR is low, and the address from R3VJADR register 632 is selected when R3PERR is high.

The 0 input terminal of return stack output multiplexer 586 is coupled to location 1 of return stack 596 through a return stack output bus 647. Return stack output multiplexer 586 is controlled by SWITCH-CNT1 signals received over a SWITCH-CNT1 line 648. Thus, a return stack address is selected when SWITCH-CNT1 is low, and the address from R3VJADR register 632 is selected when SWITCH-CNT1 is high. The selected address is communicated to a decrementer 652 over a decrementer input bus 656. The selected address then is decremented by one. The decremented address is communicated to the 0 input terminal of decrementer output multiplexer 644 over a decrementer output bus 664. Decrementer output multiplexer 644 is controlled by SWITCH-CNT2 signals received on a SWITCH-CNT2 line 668. Thus, the decremented address from decrementer 652 is selected when SWITCH-CNT2 is low, and the address from R3VJADR register 632 is selected when SWITCH-CNT2 is high. The selected address then is communicated to VCS address multiplexer 468 over a decremented address bus 672.

It will now be appreciated that the addresses used to address the vertical control stores may come from a number of sources as a result of VCS multiplexer 468. VCS multiplexer 468 receives decremented addresses from decremented address bus 672, an entry point address from entry point bus 676, an incremented address from HCS address input bus 434, or a target address from R2TARG bus 680. Which address is selected (via signals applied to a VMUX-SEL line 681) depends on a number of factors to be discussed below.

GENERAL OPERATION

In operation, each microinstruction is completed in 5 ranks, designated rank 1 through rank 5. Each rank corresponds to one clock cycle. An important operational feature of this embodiment of the invention is that the control store arrays are accessed for 2 clock cycles without a corresponding performance decrease in the microinstruction pipeline. This permits the use of lower cost memory elements. The first cycle access of the VCS and JCS ordinarily is performed during rank 1, and the second cycle access of the VCS and JCS ordinarily is performed during rank 2. The first cycle access of the HCS is performed during rank 2, and the second cycle access of the HCS is performed during rank 3. Unconditional jumps, unconditional calls, and unconditional returns are decoded during rank 2. Conditional jumps and calls are decoded during rank 3. Microinstruction test conditions are performed during rank 4.

The microinstruction fields that are pertinent to the operation of the sequencer are shown in Tables 1, 2 and 3.

TABLE 1

ENTRY POINT TABLE CONTROL FIELDS (FROM IPU 14):

| | | |
|---|---|---|
| o | EPTIssue | Hardware issue to control the instruction pipeline |
| o | EntryPt<3:15> | Entry address into VCS. |

TABLE 2

VERTICAL CONTROL FIELDS:

| | | | |
|---|---|---|---|
| o | JumpOp<0:2> | Jump operational control bits indicate one of the following: | |
| | | SeqOpr: | Sequential addressing of microinstruction lines. |
| | | JumpUnc: | Unconditional jump. |
| | | JumpCond: | Conditional jump. |
| | | CallUnc: | Unconditional call. |
| | | CallCond: | Conditional call. |
| | | SHCall: | Conditional call, stacking SHBus as the return address. |
| | | RetUnc: | Unconditional return. |
| | | Rettrap: | Unconditional return from trap operation. |
| o | Targ<2:15> | Microinstruction jump target address. | |
| o | F-issue | Firmware issue to control the instruction pipeline | |

TABLE 3

HORIZONTAL CONTROL FIELDS:

| | | |
|---|---|---|
| o | TestA<0:4> | Select TestA condition. |
| o | TestB<0:3> | Select TestB condition. |
| o | TestOp | Operation on TestA and TestB conditions. |
| o | Trapcase | Modifier to the trap address (TRAPADR) register. |
| o | TrapEnb | Trap test enable. |
| o | Inhib1 | Micropipeline NOP-control of next line. |
| o | Inhib2 | Micropipeline NOP-control of line after next. |

As noted previously, the control store banks (first bank 126 and second bank 130) are accessed for two cycles to enable the use of slow RAMS. They are accessed in a overlap fashion such that in every cycle, one bank is loading rank 3 register 288 and rank 4 register 340. FIG. 6 illustrates the control store access timing. Rank 3 register 288 and rank 4 register 340 are loaded from the control stores at the rising edge of the clock. The valid data remains on the control store data buses (e.g., buses 162, 167, 174, 184, 192, 202) for a short duration in the middle of the clock period. Latches 272, 276 and 334, enabled by the TLATCHEN signals received on TLATCHEN line 280, are used before the rank registers to hold the valid data from the control store data bus.

As noted in FIG. 4, a number of signals are used to control various multiplexers in the system, e.g., JMPTAKEN, JMPCNTA, JMPCNTB, TRAPCNTA, TRAPCNTB, etc. What follows is a discussion of how these signals are derived.

FIG. 7 shows how jump related signals are generated. A JMPTAKEN (rank 4) signal is received on a JMPTAKEN input bus 801 from DPU 26 and communicated to a JMPTAKEN register 804, a JMPTAKENA register 808, and a JMPTAKENB register 812. The JMPTAKEN signal informs microinstruction sequencer 22 that a microinstruction jump condition has been met. The output terminal of JMPTAKEN register 804 is coupled to JMPTAKEN line 617 which is also coupled to a JCSADRFLAG register 816. The output terminal of JCSADRFLAG register 816 is coupled to a JCSADRFLAG line 820. JCSADRFLAG register 816 is loaded every cycle.

JMPTAKENA register 808 is loaded in response to signals received on LOAD-A line 154. Thus, once loaded, JMPTAKENA register 808 will maintain the value stored therein for two clock cycles. The output terminal of JMPTAKENA register 808 is coupled to a JMPTAKENA line 824. JMPTAKENB register 812 is loaded in response to LOAD-B signals received on LOAD-B line 158. As noted earlier, the LOAD-B signals are merely the inverse of the LOAD-A signals. As with JMPTAKENB register 808, once JMPTAKEN register 812 is loaded, it maintains its value therein for two clock cycles. The output terminal of JMPTAKENB register 812 is coupled to a JMPTAKENB line 828. How these signals are combined into the JMPCNTA and JMPCNTB signals shall be discussed later.

FIG. 8 shows how the SWITCH related signals are generated. As shown in FIG. 8, the CSPERR signal is generated by the parity checking circuits whenever a parity error is detected in one of the control stores. In response to the CSPERR signal, the SWITCH signal is generated for three clock cycles. SWITCH1 goes high for the first clock cycle that SWITCH is high; SWITCH2 goes high during the second clock cycle that SWITCH is high; and SWITCH3 goes high during the third clock cycle that SWITCH is high.

The JMPCNTA signal is formed by performing the BOOLEAN operation JMPTAKENA*$\overline{\text{SWITCH}}$+JCSADRFLAG*SWITCH3*LOAD-A. The JMPCNTB signal is obtained by performing the BOOLEAN operation JMPTAKENB*$\overline{\text{SWITCH}}$+JCSADRFLAG*SWITCH3*LOAD-A. The SWITCH-CNT1 signal is equal to the SWITCH1 signal. The SWITCH-CNT2 signal is obtained by performing the BOOLEAN operation SWITCH1*JCSADRFLAG+SWITCH2+SWITCH3*R2LRETUNC. R2LRETUNC is a signal which is generated when JUMPOP[0:2] in rank 2=RETUNC.

FIG. 9 shows how TRAP related signals are generated. A TRAPMET (rank 4) signal is received from DPU 26 over a TRAPMET input bus 850. These signals indicate that a TRAP condition has been met. The TRAPMET signals are communicated to a TRAPMETA register 854 and a TRAPMETB register 858. TRAPMETA register 854 is loaded in response to LOAD-A signals received on LOAD-A line 154, and TRAPMETB register 858 is loaded in response to LOAD-B signals received on LOAD-B line 158. The output terminal of TRAPMETA register 854 is coupled to a TRAPMETA bus 862, and the output terminal of TRAPMETB register 858 is coupled to a TRAPMETB bus 866. TRAPCNTA is obtained by performing the BOOLEAN operation TRAPMETA*$\overline{\text{SWITCH}}$+USETRREG. USETRREG is a signal provided by the programmer for diagnostic purposes. TRAPCNTB is obtained by performing the BOOLEAN operation TRAPMETB*$\overline{\text{SWITCH}}$+USETRREG.

A number of examples shall now be provided to illustrate operation of the sequencer. The examples take the form of simulated microinstruction execution. At the top of each Figure are the microinstructions being simulated together with all relevant microinstruction fields. Then follows a detailed description of what happens on each clock cycle of these microinstructions. The columns represent the contents of a register or the value of a signal, and the rows represent a "snapshot" of these registers and signals in one machine cycle. The dotted lines between the rows represent places where a signal or the contents of a register can change. For registers, an X means "don't care", and a number is the content of that register (except in the three right-most columns where the number is the microinstruction line number in that register). For signals, a blank means the signal is false, and a "|" means the signal is true. The items displayed in each Figure are described in Table 4.

TABLE 4

| | |
|---|---|
| Clock# | The clock number simulated. |
| RetStk0 | Location zero of Return Stack 596. |
| RetStk1 | Location one of Return Stack 596. |
| PARADR | Content of CSPARADR register 629. |
| R3VJADR | Content of R3VJADR register 632. |
| R4HADR | Content of R4HADR resister 566. |
| SWITCH | The three cycle signal used to switch the control store banks if a parity error is detected. |
| PChkEn | Parity checking logic enable. |
| Pause | Pause to stop DPU clock. |
| VPerr | Vertical parity error is detected while loading rank 3 register 288. |
| HPerr | Horizontal parity error is detected while loading rank 4 register 340. |
| NOP3 | Rank 3 NOP signal. |
| NOP4 | Rank 4 NOP signal. |
| NOP5 | Rank 5 NOP signal. |
| TRAPADR | Content of TRAPADR register 414. |
| TRAPMET | Trap met signal. |
| JMPTAKEN | Jump taken signal. |
| TRAPCNTB | Trap met condition for second addressing circuit 366. |
| JMPTAKENB | Jump taken signal for second addressing circuit 366. |
| VCSADRB | Content of VCSADRB register 528. |
| JCSADRB | Content of JCSADRB register 516. |
| TADRB | Content of TADRB register 536. |
| HCSADRB | Content of HCSADRB register 546. |
| TRAPCNTA | Trap met condition for first addressing circuit 362. |
| JMPTAKENA | Jump taken signal for first addressing circuit 362. |
| VCSADRA | Content of VCSADRA register 448. |
| JCSADRA | Content of JCSADRA register 456. |
| TADRA | Content of TADRA register 406. |
| HCSADRA | Content of HCSADRA register 398. |
| LOAD-A | First bank 126 is active when true. Second bank 130 is active when false. |
| R3REG | Content of rank 3 register 288. |
| R4REG | Content of rank 4 register 340. |
| R5REG | Content of Rank 5 register 354. |

In the examples which follow, assume that the address/contents organization of the control stores are the opposite of that shown in FIG. 5. That is, the address/contents of the HCS and JCS are aligned, but the address/contents of the VCS are offset by one. Which organization is actually used depends on design choice.

In reference to FIG. 10, Clock 0 of each example is the first line of the output showing the initial condition. HCSADRB register 546 and VCSADRB register 528 are accessing the control stores in second bank 130 for the second cycle (address=0), HCSADRA register 398 and VCSADRA register 448 are accessing the control stores in first bank 126 for the first cycle (address=1), and microinstruction 0 is in rank 3 register 288. During clock 0, LOAD-A is false so rank 3 register 288 and rank 4 register 340 are loaded from second bank 130. Although the registers are loaded during clock 0, the contents do not appear at the outputs until the next clock (i.e., during clock 1). You will notice that the contents of VCSADRB register 528 is 0, but instruction 1 is accessed and loaded into R3REG. This is because the microinstruction lines in both VCS are offset by 1 as noted above (i.e., control store location 0 contains microinstruction line 1, control store location 1 contain microinstruction line 2, etc . . .). Thus, we access the rank 3 microinstruction line for clock 1 and the rank 4 microinstruction line of clock 0 at the same cycle. Meanwhile in this cycle, the address in VCSADRA register 448 is incremented (1+1=2) and loaded into VCSADRB register 328 and HCSADRB register 526 on the clock edge (since LOAD-A is false).

At clock 1, the roles of first bank 126 and second bank 130 are switched. HCSADRA register 398 and VCSADRA register 448 are accessing the first bank 126 control stores for the second cycle. HCSADRB register 546 and VCSADRB register 528 are accessing the second bank 130 for the first cycle. Here LOAD-A is true, so microinstruction line 2 is loaded into rank 3 register 288 from VCSA 106, [VCSADRA=1] microinstruction line 1 is loaded into rank 4 register 340 from HCSA 102, and an incremented address from VCSADRB register 528 (2+1=3) is loaded into VCSADRA register 448 and HCSADRA register 398. Also, part of the microinstruction from rank 4 register 340 (microinstruction line 0) is saved in rank 5 register 354 for long instructions.

The clock 2 cycle is similar to "clock 0". Here LOAD-A is false, so microinstruction line 3 is loaded into rank 3 resister 288 from VCSB 118 [VCSADRB=2], and microinstruction line 2 is loaded into rank 4 register 340 from HCSB[HCSADRB=2]. Also, part of the microinstruction from rank 4 register 340 (microinstruction line 1) is saved in rank 5 register 354 for long instructions.

This process of accessing the control store banks alternatively continues for "Clock 3" to "Clock 13" to give sequential execution of the microinstructions.

A microinstruction is in rank 1 when its address appears on VCS address bus 386 or 504. A microinstruction is in rank 2 when the first portion of it appears on rank 3 input bus 292. A microinstruction is in rank 3 when it appears on rank 3 output bus 350 and the remaining portion of the microinstruction appears on rank 4 input bus 344. A microinstruction is in rank 4 when it appears on rank 5 input bus 358, and a microinstruction is in rank 5 when it appears at the output of rank 5 register 354.

SEQUENTIAL OPERATION

The first example is shown in FIG. 10. In this example, the microinstruction lines are addressed and executed in sequence. No jumping, calling or returning is done.

During clock 3, value 4 is output from VCSADRB register 528 and HCSADRB register 546. Since LOAD-A is high at this time, the value in VCSADRB register 528 is incremented (4+1=5), and the new address is loaded into VCSADRA register 448 and HCSADRA register 398. Similarly, the address in VCSADRA register 448 is incremented (5+1=6) and loaded into VCSADRB register 528 during clock 4 since LOAD-A is low during this time. However, the value output from VCSADRB register 528 and HCSADRB register 546 remains 4 through clock 4. Since LOAD-A is low during clock 4, (i.e., LOAD-B is high), then rank 3 register 288 and rank 4 register 340 will be loaded from VCSB 118 and HCSB 122. As noted previously, the contents of each VCS is offset from their address by 1. Thus, during clock 4 the first portion of microinstruction 5 is loaded into rank 3 register 288 from VCSB 118, and the remaining portion of microinstruction 4 is loaded into rank 4 register 340 from HCSB 122.

During clock 5, the address in VCSADRB register 328 is incremented (6+1=7) and loaded into VCSADRA register 448 and HCSADRA register 398. At the same time, HCSA 102 and VCSA 106 complete their second cycle access, so the first portion of microinstruction 6 is loaded into rank 3 register 288, and the remaining portion of microinstruction 5 is loaded into rank 4 register 340. A portion of microinstruction 4 that was formerly in rank 4 register 340 is shifted into rank 5 register 354.

During clock 6, the address in VCSADRA register 448 is incremented (7+1=8) and loaded into VCSADRB register 528 and HCSADRB register 546, and VCSB 118 and HCSB 122 complete their second cycle access. The remaining portion of microinstruction 6 is loaded into rank 4 register 340, and the first portion of microinstruction 7 is loaded into rank 3 register 288 from VCSB 118. A portion of microinstruction 5 that was formerly in rank 4 register 340 is shifted into rank 5 register 354, and the cycle continues.

UNCONDITIONAL JUMP

Unconditional jumps are performed during the portion of microinstruction execution, so the jump instruction and the target address is contained in the portion of the microinstruction stored in the VCS. Assume the unconditional jump occurs in microinstruction 4, and the target microinstruction is microinstruction 12. (See FIG. 11). During compile time, the microassembler replaces the "TARG" microinstruction field with the target microinstruction address minus 1 (i.e., 12−1=11).

During clock 3, VCSADRA register 448 and HCSADRA register 398 contains a 3, and the first portion of microinstruction 4 is on rank 3 input bus 292. When the unconditional jump is detected by the JumpOp <2:15> bit in rank 3 input bus 292, the address on R2TARG bus 680 (11) is loaded into VCSADRA register 448, and the first portion of microinstruction 4 is loaded into rank 3 register 288. On the other hand, HCSADRA register 398 is loaded with the incremented address from VCSADRB register 528 (5).

During clock 4, the address from VCSADRA register 448 is incremented by incrementer 620, and the incremented address (11+1=12) is loaded into VCSADRB register 528 and HCSADRB register 546. Also note that the target address appears on R3TARG bus 484 during clock 4, and this target address is loaded into JCSADRB register 516. During clock 5, the value in VCSADRB register 528 is incremented (12+1=13) and loaded into CVSADRA register 448 and HCSADRA register 398. Target Microinstruction 12 is loaded into rank 3 register 288 from VCSA 106, microinstruction 5 is loaded into rank 4 register 340 from HCSA 102, and the value in JCSADRB register 516 (11) is loaded into TADRA register 406. During clock 6, microinstruction 12 is loaded into rank 4 register 340 from HCSB 122, and microinstruction 13 is loaded into rank 3 register 288 from VCSB 118. Since this was an unconditional jump, the values loaded into JCSADRB register 516 and TADRA register 406 are unused.

A review of FIG. 11 shows that one extra microinstruction line (microinstruction number 5) is in the pipeline. This extra line can be NOPed with the inhibit microinstruction field (INHIB1:2=10). As a result of this field, NOP3 is high during clock 5 to inhibit microinstruction 5 in rank 3 register 288, NOP4 is high during clock 6 to inhibit microinstruction 5 in rank 4 register 340, and NOP5 is high during clock 7 to inhibit microinstruction 5 in rank 5 register 354.

CONDITIONAL JUMP

FIG. 12 illustrates a conditional jump wherein the conditional jump occurs in microinstruction 3, and the target microinstruction is microinstruction 8. Assume the condition tested for turns out to be true.

During clock 3, the address on R3TARG line 484 (8) is loaded into JCSADRA register 456. Since conditional branching occurs via the JCS, it is not necessary to decrement the target address as in unconditional branch processing. At the same time, the current address in VCSADRB register 528 is incremented (4+1=5) and loaded into VCSADRA register 448 and HCSADRA register 398. This starts the control store access for both "true" and "false" paths of the branch in the next cycle. The microinstruction will be loaded from VCSA 106 if the condition is false, and the microinstruction will be loaded from JCSA 110 if the condition is true.

During clock 4, the address from VCSADRA register 448 is incremented (5+1=6) by incrementer 620, and the incremented address is loaded into VCSADRB register 528 and HCSADRB register 546. At the same time, TADRB register 536 is loaded with the address from JCSADRA register 456. Since microinstruction 3 is in rank 4 during clock 4, the test conditions are evaluated at that time.

JMPTAKENB goes high during clock 5 to indicate that the condition was met. Consequently, microinstruction 8 is loaded into rank 3 register 288 from JCSA 110 because of the signal on JMPTAKEN line 268. At the same time, HCSADRA register 398 and VCSADRA register 448 are loaded with the incremented value of TADRB register 536 (8+1=9) via bus 504. The incremented address allows sequential access from the target plus 1 microinstruction. During clock 6, microinstruction 8 is loaded into rank 4 register 340 from HCSB 122, rank 3 register 288 is loaded with microinstruction 9 from VCSB 118, and processing continues.

Since the jump condition is determined in rank 4, 2 extra microinstruction lines (4 and 5) will be in the pipeline. FIG. 12 also shows how the two extra lines are NOPed by using the inhibit bits. During clock 5, NOP4 is produced by the INHIB2 bit which inhibits rank 4 operation of microinstruction 4. NOP3 is produced by the INHIB1 bit which inhibits rank 3 operation of microinstruction 5. During clock 6, NOP5 is produced by the INHIB2 bit which inhibits rank 5 operation of microinstruction line 4. NOP4 is produced by the INHIB1 bit which inhibits rank 4 operation of microinstruction 5. During clock 7, NOP5 is produced by the INHIB2 bit which inhibits rank 5 operation of microinstruction 5. Since the JMPTAKEN signal is very late, the rank 3 operation of microinstruction 4 is not NOPed. This extra rank execution will be handled by DPU 26.

SUBROUTINE CALLS AND RETURNS

As is well known in the art, it is often advantageous to break from a sequence of instructions and "call" another sequence of instructions, temporarily halting sequential execution of the "calling" sequence in favor of transfer to the "called" sequence. Upon completion of the second or called sequence, it is desirable to return to the unexecuted remainder of the calling sequence. For example, it may be that a particular generic routine or instruction sequence can be coded and used by a variety of other routines to implement various macroinstructions. Such generic routines may include microinstruction sequences to implement multiplication, division, and like operations. Rather than replicate for the code for these sequences, in every routine that uses them, it is advantageous to code them as a subroutine once and "call" that subroutine when needed.

When such a call is taken from one routine, and a possible return contemplated, some mechanism for returning to the calling routine must be implemented; that is, after the called subroutine is executed, it is often desired to return to the calling routine from which the call was made so that the remainder of the calling routine can be executed. At times, this mechanism is in the hands of the programmer who must see to it that some form of trail is left which can be used at the completion of the called subroutine to make the return. An alternative is to relieve the coder or programmer of this task by automatically implementing the means for setting up a return in firmware (i.e., part hardware, part software). In the context of the present invention, it is the function of the return stack 596 and supporting registers, as described more fully below, that set up this return path without additional coding, unless desired.

There are three basic types of calls: A call conditional (CALLCOND), a call unconditional (CALLUNC), and an SHCALL. (A fourth type of call, used for exception (TRAP) handling, is discussed below, following this discussion of the CALLCOND, CALLUNC, and SHCALL calls.) Each called subroutine concludes with a return unconditional (RetUnc). As the names of the first two enumerated calls suggest, they may be conditional or unconditional. Thus, a CALLCOND is taken when certain tested conditions are found to be true; otherwise, the tentatively calling sequence proceeds uninterrupted. The CALLUNC is an unconditional call, and when executed will initiate a transfer from the calling sequence to the (unconditionally) called sequence, returning to the microinstruction immediately following the calling microinstruction. An SHCALL is somewhat similar to CALLCOND, and it uses the SHBUS 439, as will be described.

UNCONDITIONAL CALL

Figure 13:
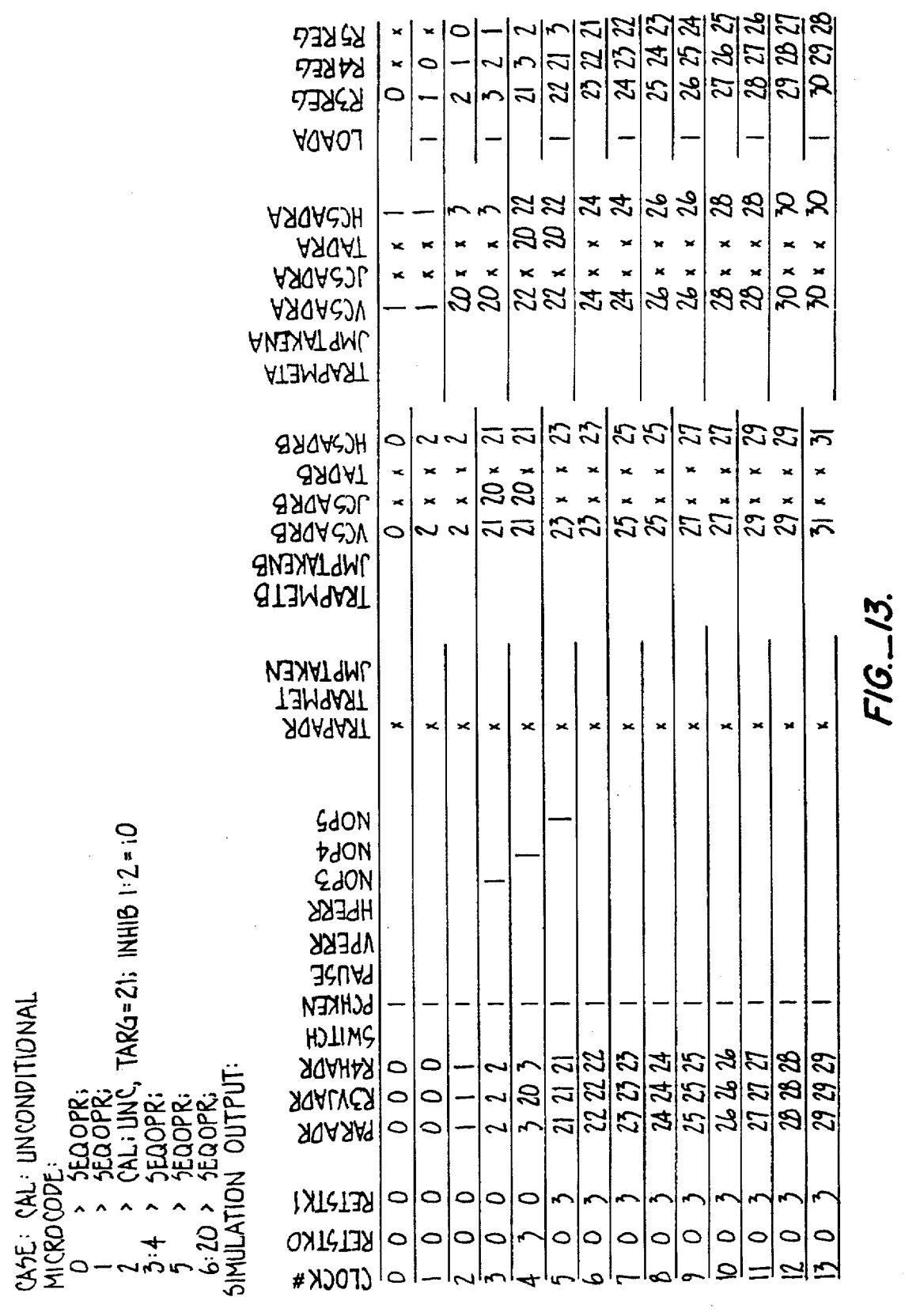

FIG. 13 shows an unconditional call (i.e., from rank 3) wherein the call is made from microinstruction 2, and the target microinstruction is microinstruction 21. Processing is substantially the same as that for unconditional jumps, except that return address stack 596 is used to save the return address.

In general operation, the value on R2TARG bus 680 is loaded into VCSADRA register 448 or VCSADRB register 528 (depending on the state of the LOAD-A and LOAD-B signals) during rank 2; the value on R3HADR bus 574 is loaded into location 0 of return stack 596 during rank 4 (the value R3HADR bus 574 is selected by the CALL-CNT signals on CALL-CNT line 599 when Rank 4 JumpOp [0:2]=CALLUNC.), and the return stack is pushed during rank 5.

When the unconditional call is detected during compile time, the micro assembler replaces the "TARG" microinstruction field with the target microinstruction address minus 1 (21−1=20). During clock 1, the address on R2TARG bus 680 (20) is loaded into VCSADRA register 448. During clock 2, the VCSADRA address is incremented (20+1=21) by incrementer 620, and the incremented address is loaded into HCSADRB register 546 and VCSADRB register 528. The value on R3TARG bus 484 (20) is also loaded into JCSADRB register 516.

During clock 3, microinstruction 21 is loaded into rank 3 register 288 from VCSA 106, the value of JCSADRB register 516 is loaded into TADRA register 406, and the return address (3) is loaded into return stack 596 at location 0. The address comes from HCSADRA register 398, R3HADR multiplexer 562, and return stack input multiplexer 570. The return address is the address of the microinstruction following the call microinstruction through the pipe, not the call microinstruction address plus 1.

During clock 4, microinstruction 21 is loaded into rank 4 register 340 from HCSB 122, and return stack 596 is pushed. As with unconditional jumps, one extra microinstruction (microinstruction 3) is in the pipeline. This can be NOPed in the same way as the extra microinstruction in unconditional jumps.

CONDITIONAL CALL

FIG. 14 shows a conditional call (i.e., from rank 4) wherein the call is made from microinstruction 6, and the target microinstruction is microinstruction 16. In general, the target address on R3TARG bus 484 is loaded into JCSADRA register 456 or JCSADRB register 516 (depending on the state of the LOAD-A and LOAD-B signals) during rank 3; the value on R3HADR bus 574 is loaded into location 0 of return stack 596 during rank 4; and return address stack 596 is pushed during rank 5 if JMPTAKEN is true. The signals on CALL-CNT line 599 select the value on R3HADR bus 574 when Rank 4 JumpOp [0:2]=CALLCOND. Thus, the value on R3HADR bus 594 [0:2]=CALLCOND. is selected for both unconditional and conditional calls.

From inspection of FIG. 14, it is noted that operation proceeds as in the conditional jump except during clock 7, the return address (7) is loaded into location 0 of return stack 596, and the return address stack is pushed during clock 8. Two extra microinstructions (7 and 8) are in the pipeline, and they can be NOPed in the same way as the extra microinstructions in conditional jumps.

A conditional call may be made with the return address being specified from SHBUS 439. In this case, JumpOp <0:2>=SHCALL, and processing proceeds as with the conditional call except the content of SHBUS 439 is treated as the return address selected by the CALL-CNT signals and loaded into location 0 of return stack 596.

It can be seen that the only difference between an SHCALL instruction execution and the CALLCOND or CALLUNC calls is that the SHCALL stacks a return address taken from the SHBUS 439, whereas the other calls stack a return address taken from within the microsequencer address registers.

It should be evident to those skilled in the art that the structure and operation of the return stack 596 provides an advantageous call mechanism. More importantly, perhaps, it should also be evident that the SHCALL instruction, and its implementation by the return stack 596 and supporting architecture, provides a very powerful call mechanism. The microcode can use the SHCALL instruction when a subroutine is called, but it is desired to return to a line of code other than the immediately succeeding instruction of the call. There are several useful examples:

Assume that, after a called subroutine, the calling routine desires to branch to another location in memory termed "label." Without an SHCALL the coding might appear as follows:

CALL SUBR;

GOTO label;

With use of the SHCALL microinstruction, SHCALL SUBR [label], the address "label" is pushed onto the return stack 596, and will be used as the return address when SUBR is completed, rather than to the line after the SHCALL instruction. This saves time.

The need to perform what is known in the art as a "computed GOTO" in FORTRAN, but done in microcode instead, is possible. The coding might be as follows:

```
SA := <index value> + BaseAddress;
CALL nextline [stack SA];
nextline:
...;
early RETURN;
```

SA is a register in DPU 26. In this case, a jump address is computed which was not known at compile time (index+ base). This address is communicated to SHBUS 439 and thereafter to return stack input multiplexer 570. By pushing this computed address onto the return stack 596, and then returning, a jump to the computed location is accomplished.

UNCONDITIONAL RETURN

FIG. 15 shows an unconditional return (i.e., from rank 3) wherein the return is made from microinstruction 20, and the target (return to) microinstruction is microinstruction 3.

In general, the value at location 1 of return stack 596 is decremented by 1 by decrementer 652 and loaded into VCSADRA register 448 or VCSADRB register 528 depending on the state of the LOAD-A and LOAD-B signals. The reason for decrementing the address stored in the return stack is that the value in R3HADR bus 574 was originally stored there. This address, while adequate to address the horizontal control store, is inaccurate for addressing the vertical control stores since the contents of each line in the vertical control stores in this embodiment is offset from their respective addresses by 1. Thus, to obtain the VCS portion of microinstruction number 3, the VCS must be addressed with the value of 2. Return stack 596 is popped during rank 4.

When the unconditional return is detected during clock 6, the most recently pushed address in the return stack is decremented by 1 (3−1=2) and loaded into VCSADRB register 528. During clock 7, the contents of VCSADRB register 528 is incremented by incrementer 620 (2+1=3), and the incremented address is loaded into HCSADRA register 398 and VCSADRA register 448. During clock 8, microinstruction 3 is loaded into rank 3 register 288 from VCSB 118, and return address stack 596 is popped. During clock 9, microinstruction 3 is loaded into rank 4 register 340 from HCSA 102, and microinstruction 4 is loaded into rank 3 register 288 from VCSA 106. One extra microinstruction (microinstruction number 21) is in the pipe. This extra line can be NOPed with the inhibit microinstruction fields as shown.

TRAP PROCESSING

The sequencer is also structured to be able to manage exception handling routines. For example, in the event of a cache memory exception (e.g., a cache "miss," parity errors, or other cache help requests), special exception-handling routines are needed—and are automatically called by the present invention.

In anticipation of a jump or call to an exception handling routine, the TRAPADR address register 414 is loaded at some convenient time from SHBUS 439 via the multiplexer 437,. Four bits from the TRAPCASE microinstruction field 703 are loaded into the R4TrapCase register 700, and then to the R5TrapCase register 702.

When an exception occurs, the TRAPMET flag (FIG. 9) is set during rank 4. When set, the contents of the trap address register 414 are communicated to one of the JCSA/JCSB memories via multiplexers 390 and 492, depending upon the condition of the TrapCNTA/B signals applied thereto, respectively. The low-order 4 bits of the 16-bit address (e.g., bits <10:13>) so communicated are overridden, at combinational logic (C/L) 422 by the content of the R5TrapCase register 702, thereby providing the capability of effecting selection of different ones of exception-handling routines.

During rank 5, return stack 596 is pushed so that both locations 0 and 1 may be loaded. At the same time, JCSA 110 or JCSB 114 are accessed with the trap target address, and the JMPTAKEN signal on line 801 (FIG.7) sets the JMPTAKEN flag 804. During rank 6, the value on R6HADR output bus 608 is stored in location 0 of return stack 596 (via return stack input multiplexer 570), and the value on R5HADR output bus 600 is loaded directly into location 1 of return stack 596. The microinstruction from the addressed JCSA 110 or JCSB 114 is also loaded into rank 3 register 288 at this time.

During rank 7, the stack is pushed so that what was the content of the R6Hadr register 592 is moved from location 0 to location 1, while what was the content of R5Hadr register 578 is moved from location 1 to location 2.

FIG. 16 shows operation of the sequencer when a trap is to be processed. The effect of the rrapcase override (via combinational logic 422) is not shown in this example. Because the trap test conditions are specified in the portion of the microinstruction, the TRAPMET signal can be true during rank 4. Assume the trap is enabled in microinstruction number 4, and the trap address from SHBUS 439 is for microinstruction number 12. During clock 6, TRAPCNTA is high, so the value of TRAPADR register 414 (12) appears on JCSA address bus 394, and this value is loaded into TADRB register 536. The JMPTAKEN and JMPTAKENB flags are also set at this time. During clock 7, microinstruction 12 is loaded into rank 3 register 288 from JCSA 110 (since JMPTAKEN is high), microinstruction 7 is loaded into rank 4 register 340 from HCSA 102, and the incremented address (13) is loaded into VCSADRA register 448 and HCSADRA register 398. VCSB 118 and HCSB 122 are addressed by TADRB register 536 (=12). Additionally, location 0 of return stack 596 is loaded from R6HADR output bus 608 (adr=4), and location 1 of return stack 596 is loaded from R5HADR output bus 600 (adr=5). During clock 8, microinstruction 12 is loaded into rank 4 register 340 from HCSB 122 (TADRB= 12), and the incremented address is loaded into VCSADRB register 528 and HCSADRB register 546. Microinstruction 13 is loaded into rank 3 register 288 from VCSB 118 (TADRB=12), and return stack 596 is pushed. The extra microinstructions 5, 6 and 7 are NOPed except microinstruction 5 in rank 3, which will be accounted for by DPU 26.

RETURN FROM TRAP

When the exception handling routine is complete, it is concluded with two successive return from TRAP (RETTRAP) microinstructions. A RETTRAP microinstruction is, in effect, an unconditional return. During rank 3 of each RETTRAP instruction, the contents of location 1 of return stack 596 is decremented by 1 by decrementer 586 and loaded into VCSADRA register 448 or VCSADRB register 528 depending on the state of the LOAD-A and LOAD-B signals. Return stack 596 is then popped. Thus, the first RETTRAP operation retrieves the first return address, and the immediately succeeding RETTRAP instruction retrieves the second return address.

FIG. 17 shows operation of the sequencer when a return from a TRAP is to be processed. Assume that a previous TRAP operation saved the address of a TRAP line 18 in location 1 of return stack 596, and the address of the successor of the TRAP line (25) has been stored in location 2 of return stack 596. Assume that both microinstruction 2 and 3 are RETTRAP microinstructions.

During clock 2, the contents of location 1 of return stack 596 is decremented (18−1=17) and loaded into VCSADRB register 528, and the return address stack is popped. During clock 3, the second RETTRAP microinstruction (microinstruction 3) is in rank 3. The new contents of location 1 of return stack 596 is decremented (25−1=24) and loaded into VCSADRA register 448, and return stack 596 is popped for the second time. During clock 4, microinstruction 18 is loaded into rank 3 register 288 from VCSB 118, and during clock 5 the successor of TRAP line 25 is loaded into rank 3 register 288 from VCSA 106. Microinstruction 18 is also loaded into rank 4 register 340 at this time. One extra microcode line (4) is in the pipeline, and it can be NOPed accordingly.

Operating the return stack as described above produces a significant benefit. For example, FIG. 18 shows a series of microinstructions C0–C8 wherein microinstruction C1 is a conditional jump to a microinstruction having address TARG1. Unlike the previous examples, the two extra microinstructions in the pipe are to be executed even if the jump is taken. (This may be done for all previous examples if desired.) That is, microinstructions C2 and C3 will not be NOPed, and INHIB1:2=00. Now assume that microinstruction C3 is a TRAP microinstruction wherein execution continues at the microinstruction whose address is TARG2.

If both COND1 and COND2 are false, then execution proceeds as in normal sequential operation. If condition 1 is false and condition 2 is true, then operation of sequencer 22 proceeds as if only a trap microinstruction was encountered, and the addresses of microinstructions C3 and C4 are saved in return stack 596. If COND1 is true and COND2 is false, then operation of sequencer 22 proceeds as if only a conditional jump microinstruction was executed. The benefit referred to occurs when both COND1 and COND2 are true. As microinstruction C1 is being executed, processing proceeds as if the usual conditional jump is to be performed, i.e., C2 and C3 are executed, and then execution continues from $C_{TARG1}$. However, microinstruction C3 is executed and COND2 is also met. Instead of executing the microinstruction sequentially from TARG1, the trap operation takes priority. However, TARG1 is in R5Hadr register 578, so both the current microinstruction address (3) and the conditional jump microinstruction target address (TARG1) are saved in return stack 596. Thus, when the trapped routine returns, it will return to microinstruction C3 and then execute the microinstruction at address TARG1 and continue sequentially from there. In known sequencers, TARG1 would have been lost. The microinstruction sequencer according to the present invention thus allows execution of both conditional jumps or calls and traps in very close proximity to each other.

EPTISSUE AND F-ISSUE

FIG. 19 illustrates how the EPTISSUE and F-issue signals are processed by microinstruction sequencer 22. Assume that a macroinstruction is executed by microinstructions 0–4, and that the first microinstruction of the next macroinstruction (ENTRYPT) is microinstruction 10. This means that the F-issue signal must be generated during microinstruction 3 which is second to last in the sequence. In response to the F-issue signal, IPU 14 supplies the entry point address minus 1 (ENTRYPT−1). During clock 2, ENTRYPT−1=9 is loaded into VCSADRB register 528. During clock 3, this address is incremented by incrementer 620, and the incremented address (9+1=10) is loaded into HCSADRA register 398 and VCSADRA register 448. During clock 4, microinstruction 10 is loaded into rank 3 register 288 from VCSB 118. During clock 5, microinstruction 10 is loaded into rank 4 register 340 from HCSA 102, and microinstruction number 11 is loaded into rank 3 register 288 from VCSA 106.

The EPTISSUE signal is issued by IPU-14 at the first macroinstruction or when a macroinstruction consists of a single microinstruction. Assume the current microinstruction is microinstruction 14, and it is the only microinstruction corresponding to a particular macroinstruction. Assume the first microinstruction of the next macroinstruction is microinstruction 25.

During clock 7, ENTRYPT−1=24 is supplied on ENTRYPT bus 676, and this value is loaded into VCSADRA register 448. During clock 8, this address is incremented by incrementer 620 (24+1=25), and the incremented address is loaded into HCSADRB register 546 and VCSADRB register 528. During clock 9, microinstruction 25 is loaded into rank 3 register 288 from VCSA 106. During clock 10, microinstruction 25 is loaded into rank 4 register 340 from HCSB 122, and microinstruction 26 is loaded into rank 3 register 288 from VCSB 118. No extra microinstruction line is in the pipe.

PARITY ERROR PROCESSING

If a parity error is detected while accessing a microinstruction from one of the control store banks, the same microinstruction will be retried from the other bank. The address where the parity error is detected is saved in CSPARADR register 629 for diagnostic purposes. The retry operations for a parity error in VCS, JCS or HCS are described below in conjunction with FIGS. 20, 21, and 22.

VCS PARITY ERROR

As shown in FIG. 20, a parity error from a VCS is detected just before loading rank 3 register 288, and the SWITCH signal goes high the next cycle. Assume a parity error occurs in microinstruction number 20 in VCSB 118. During clock 4, the parity error from VCSB 118 is detected before loading rank 3 register 288 therefrom. During clock 5, the switching logic (not shown) disables the parity checking logic and produces pauses where needed to negate microinstruction execution while sequencer 22 attempts to access microinstruction 20 from VCSA 106. At the same time, the contents of R3VJADR register 632 (19) is loaded into VCSADRA register 448 (via decrementer output multiplexer 644), and the contents of R4HADR register 566 (10) is loaded into HCSADRA register 398 (via incrementer output multiplexer 430). Also, the contents of R3VJADR register 632 (=19) is loaded and frozen in CSPARADR register 629. During clock 7, microinstructions 20 and 10 are accessed from VCSA 106 and HCSA 102, respectively. Microinstruction 10 was NOPed in rank 4 during clock 5, so it is executed at this time.

JCS PARITY ERROR

As shown in FIG. 21, a JCS parity error is treated like a VCS parity error. Assume the parity error occurs in microinstruction 8 from JCSA 110. During clock 5, the parity error from JCSA 110 is detected before loading rank 3 register 288 therefrom. During clock 6, the switching logic disables the parity checking logic pauses where needed to negate microinstruction execution while sequencer 22 attempts to access the current microinstruction 8 from VCSA 106. The contents of R3VJADR register 632 (selected by multiplexer 586) is decremented by one by decrementer 652, and the decremented address (8−1=7) is loaded into VCSADRB register 528. At the same time, the contents of R4HADR register 588 (5) is loaded into HCSADRB register 546. During clock 7, the JCSA address which caused the error (8) is loaded and frozen in CSPARADR register 629. During clock 8, old microinstructions 8 and 5 are loaded into rank 3 register 288 and rank 4 register 340 from VCSB 118 and HCSB 122, respectively. Microinstruction 5 was NOPed in rank 4 during clock 6, so it is executed at this time.

HCS PARITY ERROR

Assume a parity error occurs in microinstruction number 3. As shown in FIG. 22, a parity error from HCSA 102 is detected during clock 3 before loading rank 4 register 340 therefrom. During clock 4, the switching logic disables the parity checking logic and produces pauses where needed to negate microinstruction execution while sequencer 22 attempts to access microinstruction 3 from HCSB 122. During this time, the contents of R3VJADR register 632 (16) is loaded into VCSADRB register 528, and the contents of R4HADR register 566 (3) is loaded into HCSADRB register 546. During clock 5, the address of HCSA 102 which caused the error (5) is stored and frozen in CSPARADR register 629. During clock 6, old microinstructions 17 and 3 are accessed from VCSB 118 and HCSB 122, respectively. Microinstruction 3 was NOPed in rank 4 during clock 4, so it is executed at this time.

While the above is a complete description of a preferred embodiment of the present invention, various modifications may be employed. Consequently, the scope of the invention should not be limited except as described in the claims.

What is claimed is:

1. A microinstruction sequencer comprising:

an addressable first control store memory for storing N first microinstruction portions corresponding to N microinstructions at N addresses, each first microinstruction portion being executed at a first time during the execution of its corresponding microinstruction;

an addressable second control store memory for storing N second microinstruction portions corresponding to the N microinstructions at N addresses, each second microinstruction portion being executed at a second time during the execution of its corresponding microinstruction, wherein the second time is later than the first time;

addressing means, coupled to the first and second control store memories, for simultaneously addressing the first and second control store memories;

wherein the addressing means includes means for simultaneously addressing the first and second control store memories with identical addresses;

a first register for receiving the first microinstruction portions from the first control store memory;

a second register for receiving the second microinstruction portions from the second control store memory;

register loading means, coupled to the first control store memory, to the second control store memory, to the first register, and to the second register, for repetitively loading the first register with addressed first microinstruction portions from the first control store memory and simultaneously loading the second register with addressed second microinstruction portions from the second control store memory; and wherein, for every positive integer L less than N, the first microinstruction portion stored at address L in the first control store memory and the second microinstruction portion stored at address L+1 in the second control store memory are portions of a single microinstruction.

2. The sequencer according to claim 1 further comprising:

an addressable third control store memory, coupled to the addressing means, for storing the N first microinstruction portions at N addresses;

wherein, for every positive integer M less than or equal to N, the first microinstruction portion stored at address M in the first control store memory is identical to the first microinstruction portion stored at address M+1 in the third control store memory;

branch detecting means for detecting an occurrence of a microinstruction branch condition; and wherein the register loading means is coupled to the branch detecting means and to the third control store memory for loading an addressed first microinstruction portion from the third control store memory into the first register when the microinstruction branch condition is detected.

3. A method of processing microinstructions comprising the steps of:

storing N first microinstruction portions corresponding to N microinstructions at N addresses in a first control store memory, each first microinstruction portion being executed at a first time during the execution of its corresponding microinstruction;

storing N second microinstruction portions corresponding to the N microinstructions at N addresses in a second control store memory, each second microinstruction portion being executed at a second time during the execution of its corresponding microinstruction, wherein the second time is later than the first time;

simultaneously addressing the first and second control store memories with identical addresses;

repetitively loading a first register with addressed first microinstruction portions from the first control store memory while simultaneously loading a second register with addressed second microinstruction portions from the second control store memory; and wherein, for every positive integer L less than N, the first microinstruction portion stored at address L in the first control store memory and the second microinstruction portion stored at address L+1 in the second control store memory are portions of a single microinstruction.

4. The method according to claim 3 further comprising the steps of:

storing the N first microinstruction portions at N addresses of a third control store memory;

wherein, for every positive integer M less than or equal to N, the first microinstruction portion stored at address M in the first control store memory is identical to the first microinstruction portion stored at address M+1 in the third control store memory;

detecting an occurrence of a microinstruction branch condition; and wherein the loading step further comprises the step of loading an addressed first microinstruction portion from the third control store memory into the first register when the microinstruction branch condition is detected.

5. A microinstruction sequencer comprising:
- a first microinstruction bank including:
    - an addressable first control store memory for storing N first microinstruction elements corresponding to N microinstructions at N addresses;
- a second microinstruction bank including:
    - an addressable second control store memory for storing the N first microinstruction elements corresponding to the N microinstructions at N addresses;
- wherein, for every positive integer K less than or equal to N, the address of the first microinstruction element stored in the first control store memory for a $K^{th}$ microinstruction is identical to the address of the first microinstruction element stored in the second control store memory for the $K^{th}$ microinstruction; bank addressing means, coupled to the first control store memory and to the second control store memory, for sequentially addressing the first and second control store memories and alternating between the first and second control store memories upon each addressing cycle;
- a first register;
- register loading means, coupled to the first control store memory, to the second control store memory, and to the first register, for repetitively loading the first register with the addressed first microinstruction elements from one of the first control store memory or second control store memory; and
- wherein each first microinstruction element is a portion of its corresponding microinstruction that is executed at a first time during the execution of the microinstruction; wherein the first microinstruction bank further comprises an addressable third control store memory, coupled to the bank addressing means, for storing N second microinstruction portions corresponding to the N microinstructions at N addresses, each second microinstruction portion being executed at a second time during the execution of its corresponding microinstruction, the second time being later than the first time; wherein the second microinstruction bank further comprises an addressable fourth control store memory, coupled to the bank addressing means, for storing the N second microinstruction portions corresponding to the N microinstructions at N addresses; wherein, for every positive integer L less than or equal to N, the address of the second microinstruction portion stored in the third control store memory for an $L^{th}$ microinstruction is identical to the address of the second microinstruction portion stored in the fourth control store memory for the $L^{th}$ microinstruction.

6. The sequencer according to claim 5 further comprising:
- a second register; and
- wherein the register loading means loads the second register with the addressed second microinstruction portions from one of the third control store memory or fourth control store memory at the same time as the first register is loaded with the addressed first microinstruction portions from one of the first control store memory or second control store memory.

7. The sequencer according to claim 6 wherein the bank addressing means simultaneously addresses the first and third control store memories with identical addresses and wherein the bank addressing means simultaneously addresses the second and fourth control store memories with the same address.

8. The sequencer according to claim 7 wherein, for some positive integer L less than N, the first microinstruction portion stored at address L in the first and second control store memories and the second microinstruction portion stored at address L+1 in the third and fourth control store memories are portions of a single microinstruction.

9. The sequencer according to claim 8 wherein the first microinstruction bank further comprises an addressable fifth control store memory, coupled to the bank addressing means, for storing the N first microinstruction portions at N addresses; wherein the second microinstruction bank further comprises an addressable sixth control store memory, coupled to the bank addressing means, for storing the N first microinstruction portions at N addresses; and wherein, for every positive integer M less than or equal to N, the first microinstruction portion stored at address M in the first and second control store memories is identical to the first microinstruction portion stored at address M+1 in the fifth and sixth control store memories.

10. The sequencer according to claim 9 further comprising:
- branch detecting means for detecting an occurrence of a microinstruction branch condition; and
- wherein the register loading means loads the addressed first microinstruction portion from one of the fifth or sixth control store memory into the first register when the microinstruction branch condition is detected.

11. A method of processing microinstructions comprising the steps of:
- storing N first microinstruction elements corresponding to N microinstructions at N addresses of a first control store memory in a first microinstruction bank;
- storing the N first microinstruction elements corresponding to the N microinstructions at N addresses of a second control store memory in a second microinstruction bank;
- wherein, for every positive integer K less than or equal to N, the address of the first microinstruction element stored in the first control store memory for a $K^{th}$ microinstruction is identical to the address of the first microinstruction element stored in the second control store memory for the $K^{th}$ microinstruction;
- sequentially addressing the first and second control store memories;
- alternating between the first and second control store memories upon each addressing cycle;
- repetitively loading a first register with the addressed first microinstruction elements from one of the first control store memory or second control store memory; and
- wherein each first microinstruction element is a portion of its corresponding microinstruction that is executed at a first time during the execution of the microinstruction, and further comprising the steps of:
    - storing N second microinstruction portions corresponding to the N microinstructions at N addresses of a third control store memory in the first microinstruction bank, each second microinstruction portion being executed at a second time during the execution of its corresponding microinstruction, the second time being later than the first time;
    - storing the N second microinstruction portions corresponding to the N microinstructions at N addresses of a fourth control store memory in the second microinstruction bank; and
    - wherein, for every positive integer L less than or equal to N, the address of the second microinstruction portion stored in the third control store memory for an $L^{th}$ microinstruction is identical to the address of the second microinstruction portion stored in the fourth control store memory for the $L^{th}$ microinstruction.

12. The method according to claim 11 wherein the loading step further comprises the steps of:
loading a second register with the addressed second microinstruction portions from one of the third control store memory or fourth control store memory at the same time as the first register is loaded with the addressed first microinstruction portions from one of the first control store memory or second control store memory.

13. The method according to claim 12 wherein the addressing step further comprises the steps of:
simultaneously addressing the first and third control store memories with identical addresses; and
simultaneously addressing the second and fourth control store memories with the same address.

14. The method according to claim 13 wherein, for some positive integer L less than N, the first microinstruction portion stored at address L in the first and second control store memories and the second microinstruction portion stored at address L+1 in the third and fourth control store memories are portions of a single microinstruction.

15. The method according to claim 14 further comprising the steps of:
storing the N first microinstruction portions at N addresses of a fifth control store memory in the first microinstruction bank;
storing the N first microinstruction portions at N addresses of a sixth control store memory in the second microinstruction bank; and
wherein, for every positive integer M less than or equal to N, the first microinstruction portion stored at address M in the first and second control store memories is identical to the first microinstruction portion stored at address M+1 in the fifth and sixth control store memories.

16. The method according to claim 15 further comprising the step of detecting an occurrence of a microinstruction branch condition, and wherein the loading step further comprises the step of loading the addressed first microinstruction portion from one of the fifth or sixth control store memory into the first register when the microinstruction branch condition is detected.

17. A microinstruction sequencer comprising:
an addressable control store memory for storing a plurality of microinstruction elements at a corresponding plurality of control store addresses;
retrieving means, coupled to the control store memory, for sequentially retrieving microinstruction elements from the control store memory, the retrieving means including:
addressing means, coupled to the control store memory, for sequentially providing control store addresses for addressing the control store memory;
a microinstruction register for storing microinstruction elements;
microinstruction communicating means, coupled to the control store memory and to the microinstruction register, for communicating microinstruction elements addressed by the addressing means from the control store memory to the microinstruction register;
a return address stack for storing a plurality of control store addresses for a corresponding plurality of microinstruction elements as return addresses;
branch detecting means, coupled to the microinstruction communicating means, for detecting an occurrence of a microinstruction branch condition in a microinstruction element communicated to the microinstruction register; and
address storing means, coupled to the branch detecting means, to the addressing means, and to the return address stack, for storing multiple control store addresses from the addressing means in the return address stack in response to a single detected microinstruction branch condition.

18. The sequencer according to claim 17 wherein the address storing means includes means for storing the control store address of the microinstruction element in which the microinstruction branch condition was detected together with the control store address of the microinstruction element that would have been communicated to the microinstruction register immediately thereafter had the microinstruction branch condition not been detected.

19. The sequencer according to claim 18 further comprising:
return detecting means, coupled to the microinstruction communicating means, for detecting an occurrence of a microinstruction return condition in a microinstruction element communicated to the microinstruction register;
wherein the addressing means includes return address retrieving means, coupled to the return detecting means and to the return address stack, for retrieving a return address stored in the return address stack when the microinstruction return condition is detected; and
wherein the addressing means includes means for addressing the control store memory with the return address retrieved from the return address stack when the microinstruction return condition is detected.

20. The sequencer according to claim 19 wherein the control store memory stores a plurality of return microinstruction elements having the microinstruction return condition specified therein, and wherein the retrieving means includes means for retrieving the plurality of return microinstruction elements in an uninterrupted sequence.

21. The sequencer according to claim 20 wherein the address storing means stores two control store addresses in the return stack in response to a single detected microinstruction branch condition.

22. A method for processing microinstructions comprising the steps of:
storing a plurality of microinstruction elements in a control store memory at a corresponding plurality of control store addresses;
sequentially providing control store addresses for addressing the control store memory;
communicating addressed microinstruction elements from the control store memory to a microinstruction register;
detecting an occurrence of a microinstruction branch condition in a microinstruction element communicated to the microinstruction register; and
storing multiple control store addresses as return addresses in a return address stack in response to a single detected microinstruction branch condition.

23. The method according to claim 22 wherein the address storing step includes the step of storing the control store address of the microinstruction element in which the microinstruction branch condition was detected together with the control store address of the microinstruction element that would have been communicated to the microinstruction register immediately thereafter had the microinstruction branch condition not been detected.

24. The method according to claim 23 further comprising the steps of:

detecting an occurrence of a microinstruction return condition in a microinstruction element communicated to the microinstruction register;

retrieving a return address stored in the return address stack when the microinstruction return condition is detected; and addressing the control store memory with the return address retrieved from the return address stack.

25. The method according to claim 24 further comprising the steps of:

storing, in the control store memory, a plurality of return microinstruction elements having the microinstruction return condition specified therein; and retrieving the plurality of return microinstruction elements in an uninterrupted sequence.

26. The sequencer according to claim 25 wherein the return address storing step comprises the step of storing two control store addresses in the return stack in response to a single detected microinstruction branch condition.

* * * * *